US007079209B2

United States Patent
Nakagawa

(10) Patent No.: US 7,079,209 B2
(45) Date of Patent: Jul. 18, 2006

(54) RETARDATION COMPENSATION SYSTEM AND LIQUID CRYSTAL PROJECTOR WITH DIFFERENT COMPENSATION FOR ONE OF THE PRIMARY COLORS

(75) Inventor: Kenichi Nakagawa, Shizuoka (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 97 days.

(21) Appl. No.: 10/714,676

(22) Filed: Nov. 18, 2003

(65) Prior Publication Data

US 2004/0095535 A1    May 20, 2004

(30) Foreign Application Priority Data

Nov. 20, 2002    (JP)    ............... 2002-337028

(51) Int. Cl.
G02F 1/13363    (2006.01)
G02F 1/1335    (2006.01)

(52) U.S. Cl. ............... 349/119; 349/8; 349/117
(58) Field of Classification Search ........ 349/117–121, 349/8
See application file for complete search history.

(56) References Cited

U.S. PATENT DOCUMENTS 5,157,523 A * 10/1992 Yamagishi et al. ............ 349/8
5,638,197 A    6/1997 Gunning, III et al.
6,590,707 B1 * 7/2003 Weber ........................ 359/498
2002/0018162 A1    2/2002 Suzuki et al.

FOREIGN PATENT DOCUMENTS

JP    2002-31782    1/2002
JP    2002-131750    5/2002

OTHER PUBLICATIONS

J. P. Eblen, Jr., "17.4: Birefringent Compensators for Normally White TN-LCDs," Symposium Digest, Society for Information Display, 1994, pp. 245-248.

* cited by examiner

Primary Examiner—Andrew Schechter
(74) Attorney, Agent, or Firm—Buchanan Ingersoll PC

(57) ABSTRACT

Three retardation compensators are provided for compensating the retardation of liquid crystal devices for red, green and blue light, respectively. Each of the retardation compensators is composed of plural high and low refractive index thin film layers alternately layered on a substrate. Because of the difference in the wavelength dependences of the liquid crystal device and the retardation compensator, the retardation R2 of the retardation compensator becomes much larger than the retardation R1 of the liquid crystal device in short wavelength region of the visible band. In order to match the retardation, the thickness of the retardation compensator for blue light is smaller than those for red and green light.

12 Claims, 14 Drawing Sheets

[ TN LIQUID CRYSTAL DEVICE ]

| λ (nm) | Δn | d·Δn (d=4.5μm) | Re (0.7×d·Δn) |
|---|---|---|---|
| 400 | 0.1360 | 0.612 | 0.428 |
| 450 | 0.1310 | 0.590 | 0.413 |
| 500 | 0.1270 | 0.572 | 0.400 |
| 550 | 0.1240 | 0.558 | 0.391 |
| 600 | 0.1210 | 0.545 | 0.381 |
| 650 | 0.1190 | 0.536 | 0.375 |
| 700 | 0.1180 | 0.531 | 0.372 |

[ RETARDATION COMPENSATION FILM (1): d=2 μm ]

| λ (nm) | REFRACTIVE INDEX | | $N_{TE}$ | $N_{TM}$ | Δn | d·Δn (μm) |
|---|---|---|---|---|---|---|
| | $TiO_2$ LAYER | $SiO_2$ LAYER | | | | |
| 400 | 2.5530 | 1.480 | 2.188 | 1.908 | 0.280 | 0.561 |
| 450 | 2.4492 | 1.476 | 2.114 | 1.877 | 0.237 | 0.474 |
| 500 | 2.3783 | 1.472 | 2.064 | 1.855 | 0.209 | 0.418 |
| 550 | 2.3404 | 1.470 | 2.037 | 1.842 | 0.195 | 0.390 |
| 600 | 2.3095 | 1.468 | 2.015 | 1.832 | 0.184 | 0.368 |
| 650 | 2.2885 | 1.467 | 2.001 | 1.824 | 0.177 | 0.354 |
| 700 | 2.2735 | 1.465 | 1.990 | 1.819 | 0.171 | 0.342 |

[ EMBODIMENT 1 ]

| λ (nm) | TN LCD (Re) | d (μm) | d·Δn | |
|---|---|---|---|---|
| 400 | 0.428 | 1.8 | 0.504 | RETARDATION COMPENSATION FILM FOR BLUE |
| 450 | 0.413 | | 0.426 | |
| 500 | 0.400 | | 0.376 | |
| 500 | 0.400 | 2.0 | 0.418 | RETARDATION COMPENSATION FILM FOR GREEN |
| 550 | 0.391 | | 0.390 | |
| 600 | 0.381 | | 0.368 | |
| 600 | 0.381 | 2.1 | 0.386 | RETARDATION COMPENSATION FILM FOR RED |
| 650 | 0.375 | | 0.371 | |
| 700 | 0.372 | | 0.359 | |

FIG. 13

[ ECB LCD ]

| λ (nm) | Δn | d·Δn (d=4.5μm) |
|---|---|---|
| 400 | 0.1360 | 0.612 |
| 450 | 0.1310 | 0.590 |
| 500 | 0.1270 | 0.572 |
| 550 | 0.1240 | 0.558 |
| 600 | 0.1210 | 0.545 |
| 650 | 0.1190 | 0.536 |
| 700 | 0.1180 | 0.531 |

FIG. 14

[ RETARDATION COMPENSATION FILM (2): d=2.9μm ]

| λ (nm) | REFRACTIVE INDEX | | $N_{TE}$ | $N_{TM}$ | Δn | d·Δn (μm) |
|---|---|---|---|---|---|---|
| | $TiO_2$ LAYER | $SiO_2$ LAYER | | | | |
| 400 | 2.5530 | 1.480 | 2.188 | 1.908 | 0.280 | 0.812 |
| 450 | 2.4492 | 1.476 | 2.114 | 1.877 | 0.237 | 0.687 |
| 500 | 2.3783 | 1.472 | 2.064 | 1.855 | 0.209 | 0.606 |
| 550 | 2.3404 | 1.470 | 2.037 | 1.842 | 0.195 | 0.566 |
| 600 | 2.3095 | 1.468 | 2.015 | 1.832 | 0.184 | 0.534 |
| 650 | 2.2885 | 1.467 | 2.001 | 1.824 | 0.177 | 0.513 |
| 700 | 2.2735 | 1.465 | 1.990 | 1.819 | 0.171 | 0.496 |

[EMBODIMENT 2]

| λ (nm) | TN LCD (Re) | d (μm) | d·Δn | |
|---|---|---|---|---|
| 400 | 0.612 | | 0.699 | RETARDATION COMPENSATION FILM FOR BLUE |
| 450 | 0.590 | 2.5 | 0.592 | |
| 500 | 0.572 | | 0.523 | |
| 500 | 0.572 | | 0.606 | RETARDATION COMPENSATION FILM FOR GREEN |
| 550 | 0.558 | 2.9 | 0.566 | |
| 600 | 0.545 | | 0.533 | |
| 600 | 0.545 | | 0.552 | RETARDATION COMPENSATION FILM FOR RED |
| 650 | 0.536 | 3.0 | 0.530 | |
| 700 | 0.531 | | 0.514 | |

RETARDATION COMPENSATION SYSTEM AND LIQUID CRYSTAL PROJECTOR WITH DIFFERENT COMPENSATION FOR ONE OF THE PRIMARY COLORS

BACKGROUND OF THE INVENTION

1. Field of the Invention

The present invention relates to a retardation compensation system that is effectively applied to a liquid crystal projector having three liquid crystal devices for full color display, and a liquid crystal projector having the retardation compensation system.

2. Description Related to the Prior Art

A three-panel type liquid crystal projector has three liquid crystal devices for red, green and blue images. The liquid crystal devices modulate red, green and blue light in accordance with three color images to form red, green and blue image lights. The red, green and blue image lights are combined in a combination prism, and focused on the screen through a projection lens system, so that many people can view a full color image at the same time. The above operation of the liquid crystal projector is the same, although the optical system is different in accordance with whether the liquid crystal projector is a front projection type or a rear projection type, and with whether the liquid crystal device is a transmissive type or a reflective type. The front projection type projector projects the image from the front side (viewer side) of the screen, while the rear projection type projector projects the image from the rear side of the screen.

Although various types of liquid crystal devices are available to the liquid crystal projector, TN (Twisted Nematic) type liquid crystal device is mainly used. The TN type liquid crystal device has a liquid crystal layer between a pair of substrates. The orientation of major axes of liquid crystal molecules in the liquid crystal layer is kept parallel to the substrates, and inclined gradually in the thickness direction so that the major axes of the liquid crystal molecules twist smoothly by 90 degrees along a path from one substrate and the other substrate. The liquid crystal molecule layer is sandwiched by a pair of polarizing plates (polarizer and analyzer). The polarization axes of the polarizing plates for a normally white liquid crystal device are perpendicular to each other (cross nicol configuration). The polarization axes of the polarizing plates for a normally black liquid crystal device are parallel to each other (parallel nicol configuration).

The liquid crystal device can display an image by use of its optical rotatory effect. In the normally white type liquid crystal device, incident light is linearly polarized by the first polarizing plate. When no voltage is applied to a non-selected pixel in the liquid crystal device, the liquid crystal molecules in the liquid crystal layer are twisted so as to rotate the polarization direction of linearly polarized light by 90 degrees. Linearly polarized light through the liquid crystal layer can pass the second polarizing plate, so that the non-selected pixel appears as a white state. When a certain level of voltage is applied to a selected pixel, twisted alignment of the liquid crystal molecules does not appear. In that case, the polarization direction of linearly polarized light is not rotated in the liquid crystal layer, so linearly polarized light is blocked by the second polarizing plate. Thus, the selected pixel appears as a black state.

The liquid crystal device has the disadvantage of narrow viewing angle because of its birefringence. Birefringence becomes dominant as the applied voltage to the liquid crystal layer increases. Although incident light perpendicular to the liquid crystal device is completely blocked in the black state, the liquid crystal layer exhibits birefringence to oblique incident light to change linearly polarized light into elliptical polarized light. Since elliptical polarized light can pass the second polarizing plate, leakage of incident light causes the decrease in the black density of the selected pixel.

Such birefringence of the liquid crystal molecules is appeared at a state between the white and black states, so oblique incident light partially leaks. Thus, the contrast ratio of the image on the liquid crystal device decreases if viewed obliquely. Any type of the liquid crystal device has, more or less, such birefringence.

A direct view type liquid crystal display to observe the image directly has a retardation compensator for the purpose of decreasing birefringent effect. As the retardation compensator, "Fuji WV Film Wide View A" (trade name, hereinafter referred to as "WV Film"), manufactured by Fuji Photo Film Co., Ltd., has been in the market. A form birefringence layer with stacked thin films is used as the retardation compensator to prevent the decrease of the contrast ratio of the obliquely viewed image, as described in the publication, Eblen J. P., "Birefringent Compensators for Normally White TN-LCDs", SID Symposium Digest, Society for Information Display, 1994, pp. 245–248. In addition, U.S. Pat. No. 5,638,197 describes a retardation compensator in which thin film is obliquely deposited on a substrate.

The retardation compensators described above are utilized to the direct view type liquid crystal display in which an observer right in front of the display panel observes the image at a distance more than the distance of distinct vision. In the direct view type liquid crystal display, the observer can adjust the contrast ratio of the image in the edge area by moving the eye positions slightly. If the image is observed by plural observers at the same moment, low contrast ratio area unlikely occurs because the distance between the displayed image and the observers is large enough to decrease the viewing angle.

In the liquid crystal projector, incident light through the liquid crystal layer is projected to the screen through a projection lens system. The observer can view the projected image on the screen. The contrast ratio of the displayed image decreases because of oblique incident light to the liquid crystal layer. Then, it is impossible to increase the contrast ratio of the projected image even if the observer tries to change the viewing angle. The projection lens system with large back focus can increase the contrast ratio of the projected image because such lens system decreases the incident angle of incident light to the liquid crystal layer. Such projection lens system, however, is disadvantageous in terms of making the projector smaller.

Accordingly, the technique to increase the viewing angle of the liquid crystal display is effective in order to solve the contrast ratio problem of the liquid crystal projector. For instance, U.S. Patent Application Publication No. 2002/0018162 and Japanese Laid-Open Patent Publications (JP-A) No. 2002-031782 describe the technique to increase the contrast ratio of the projected image by applying the retardation compensator to the liquid crystal device for the liquid crystal projector. The liquid crystal projector in U.S. Patent Application Publication No. 2002/0018162 describes organic materials, such as the WV Film, as the retardation compensator for the TN type liquid crystal device. The retardation compensator in JP-A No. 2002-031782 discloses a uniaxial birefringent crystal, such as single crystal sapphire and crystal. In addition, JP-A No. 2002-131750 describes a Discotic type liquid crystal as the retardation compensator.

The retardation compensators described above work as the form birefringence body to exhibit optical anisotropy effect depending upon the incident angle of oblique incident light. Such anisotropy effect of the retardation compensator can prevent the decrease in the contrast ratio of the projected image which is caused by oblique emanation light from the liquid crystal device with large emanation angle.

The organic retardation compensator tends to be colored by long exposure to light containing ultraviolet component. Intensity of the light source in the liquid crystal projector has to be higher than that of the direct view type liquid crystal display. Higher intensity of the light source causes excessive heat to the retardation compensator. The retardation compensator tends to be colored brown in 2000 to 3000 hours. Because of such low durability, it is difficult to utilize the organic retardation compensator to the home use liquid crystal projection TV.

The retardation compensator made of sapphire or crystal has great durability for long-term use, but the sapphire and crystal are expensive. Moreover, the cut surface and the thickness of the sapphire or crystal must be controlled precisely to exhibit desired optical characteristics. Furthermore, the orientation of the retardation compensator of sapphire or crystal must be aligned precisely in the assembly of the projection optical system. Accordingly, sapphire or crystal retardation compensator is not appropriate for household type liquid crystal projector in terms of manufacture cost, regardless of great durability.

Although the liquid crystal projector has three liquid crystal devices for the purpose of displaying a full color image, the structure of the retardation compensator is the same regardless of the color. When the liquid crystal projector adopts the retardation compensator for green light, phase retardation of red and blue light may not be compensated appropriately. In that case, the intensity of the black state pixel increases so that the contrast ratio of the pixel image decreases. Moreover, the black pixel may be colored because of the change in the color balance.

SUMMARY OF THE INVENTION

An object of the present invention is to provide a retardation compensation system, at a low manufacture cost, that can increase the contrast ratio of the image projected on the screen.

Another object of the present invention is to increase durability of the retardation compensation system enough for long-term use, such as a household television.

Further object of the present invention is to keep the color balance of the image in low intensity range.

Still further object of the present invention is to provide a liquid crystal projector that adopts the above retardation compensation system.

To achieve the above objects, the retardation compensation system according to the present invention compensates retardation of plural primary colors individually, which is caused by birefringence of incident light passing through liquid crystal device of corresponding primary color. The retardation compensation system has at least two kinds of retardation compensators, each of which is composed of inorganic materials. The retardation compensator is located in an incident side, an emanation side or both sides of a liquid crystal device for each primary color. The retardation compensator for the primary color having shortest wavelength has different physical structure from those for other primary colors. As the retardation compensator, it is possible to utilize a retardation compensation film in which inorganic thin film layers of high refractive index and low refractive index are alternatively deposited. Each of the thin films preferably has a thickness between $1/100$ and $1/5$ of the standard wavelength of corresponding primary color.

The materials for high and low refractive index layers may be the same, regardless of primary color. In order to differentiate the physical structure, the retardation compensation film for the primary color of shortest wavelength has less total layers than those for other primary colors. Moreover, a three plate type liquid crystal projector with the retardation compensation system is also within the scope of the present invention.

The basic function of the retardation compensator according to the present invention will be explained. In FIG. 1, a liquid crystal device 2 has a liquid crystal layer 5 that is sandwiched between a transparent base substrate 3b and an opposite substrate 3a having orientation films on both inner surfaces. The liquid crystal layer 5 is composed of liquid crystal molecules. In order to drive the liquid crystal layer 5 of each pixel, each of the substrates 3a, 3b has matrix electrodes, common electrodes and transparent electro-conductive films, which are not illustrated in the drawing. In an upstream side of the liquid crystal device 2 with respect to the light path, there is a polarizer to change an incident light S1 into linearly polarized light that enters the liquid crystal device 2.

The liquid crystal layer 5 with elongated liquid crystal molecules works as a positive retarder. Thus, the incident light S1 is separated into an ordinary component So and an extraordinary component Se during the passage through the liquid crystal layer 5. There is a phase shift between the extraordinary component Se and the ordinary component So. The phase retardation P1 depends on the product of a birefringence value $\Delta n1$ of liquid crystal molecules and a thickness d1 of the liquid crystal layer 5. In terms of crystal optics, the product $\Delta n1 \cdot d1$ is defined as retardation R1. Then, the phase retardation P1 is defined as $\alpha \cdot R1$ ($=\alpha \cdot \Delta n1 \cdot d1$). The coefficient $\alpha$ takes a value between 0 and 1, in accordance with the incident angle $\theta$ of incident light S1, orientation of the liquid crystal molecules, applied voltage to the liquid crystal layer 5, and so forth.

An emanated light S2 from the liquid crystal device 2 is composed of the ordinary component So and the extraordinary component Se having a phase shift. Thus, the emanated light S2 has an elliptically polarized component depending upon the phase shift R1, even if the incident light S1 is linearly polarized. For the purpose of deleting the elliptically polarized component, the phase shift is compensated by disposing a phase compensator 6 between the emanation side surface of the liquid crystal device 2 and an analyzer.

The retardation compensator 6 has an inorganic retardation compensation film 8 formed on a transparent substrate 7, and works as a negative retarder to delay the phase of the ordinary component So to the extraordinary component Se. Although the structure of the phase compensation film 8 is different from the liquid crystal molecules in terms of crystal optics, retardation of the phase compensation film 8 is defined as the product of the birefringence value $\Delta n2$ which comes from its anisotropy and the thickness d2 of the phase compensation film 8. The phase retardation P2 between the ordinary and extraordinary components is $\beta \cdot R2$ ($=\beta \cdot \Delta n2 \cdot d2$). If the condition P1=P2 is satisfied, the emanated light S3 from the retardation compensator 6 becomes linearly polarized light because the retardation due to the liquid crystal device 2 and the retardation compensator 6 are cancelled with each other. Since a linearly polarized light enters the analyzer, disposed downstream of the phase compensator 6, it is possible to increase the image contrast effectively.

Although the coefficients $\alpha$, $\beta$ change in accordance with the incident angle $\theta$, the influence of the incident angle $\theta$ may be disregarded if the light ray passes the liquid crystal device 2 and retardation compensator 6 at a same incident angle. Accordingly, in order to determine the coefficient $\alpha$ to satisfy P1=P2, it is possible to consider only the factors depending upon the liquid crystal device 2, such as orientation of the liquid crystal molecules and the applied voltage to the liquid crystal device 2. Note that whether the birefringence value $\Delta n1$, $\Delta n2$ takes a positive value or negative value will be specified, if necessary.

As explained above, the objects of the present invention are achieved by making the phase retardation P2 of the retardation compensator 6 as close as possible to the phase retardation P1 of the liquid crystal device 2, in other words, by equating the retardations R1 and R2. The liquid crystal device 2, however, has various types, such as the TN (Twisted Nematic) type and the ECB (Electrically Controlled Birefringence) type. In addition, the retardation compensator 6 has various structures such as uniaxial structure (a-plate and o-plate, for instance) and a layered structure. Thus, in order to make the retardation R2 as close as possible to the retardation R1, it is necessary to determine the parameters (d2, $\Delta n2$) in consideration of the type of the retardation compensator 6 and the liquid crystal device 2. In the preferred embodiments, the parameters (d2, $\Delta n2$) are decided to compensate the retardation of the liquid crystal device 2 of TN type and ECB type.

It is important to consider that the positive birefringence value $\Delta n1$ of the liquid crystal layer 5 and the negative value birefringence $\Delta n2$ of the retardation compensation film 8 change depending upon the wavelength, respectively. If the birefringence values $\Delta n1$, $\Delta n2$ do not have wavelength dependence, or if their wavelength dependences are approximately the same, the wavelength of incident light as well as the incident angle may be disregarded in deciding the retardation R2 of the retardation compensator 8. Since the wavelength dependences of the birefringence values $\Delta n1$, $\Delta n2$ are different from each other, however, it is necessary to consider this factor.

Wavelength dependence of the retardation R1 ($=\Delta n1 \cdot d1$) of a conventional liquid crystal layer 5 and the wavelength dependence of the retardation R2 ($=\Delta n2 \cdot d2$) of the phase compensation film 8 are depicted in FIG. 2. In the visible band, the retardation R1 is large in the short wavelength side, and becomes smaller gradually as the wavelength becomes longer. Although the retardation R2 of the retardation compensation film 8 is large in the short wavelength side and is small in the long wavelength side, the retardation R2 changes more rapidly than the retardation R1 in short wavelength side. Because the other parameter, thickness is not related to the wavelength, birefringence values $\Delta n1$, $\Delta n2$ cause the wavelength dependences shown in FIG. 2.

In FIG. 2, the thickness d2 of the retardation compensator 8 with predetermined birefringence value $\Delta n2$ is adjusted, so that the retardation R2 becomes the same as the predetermined retardation R1 of the liquid crystal layer 5 at the standard wavelength of green light (550 nm, corresponding to the peak of visual sensitivity). Although the retardation R2 is shifted vertically in the graph by changing the thickness d2, it is difficult to correct the difference in the retardation, especially in short wavelength side, because the wavelength dependence of the birefringence value $\Delta n2$ is preserved.

The liquid crystal devices in a three-plate type liquid crystal projector have the same characteristics, so it is necessary to change the retardation R2 for each primary color if phase retardations P1 and P2 are largely different. In order to change the retardation R2, the thickness d2 of the retardation compensation film 8 for blue is decreased to obtain the retardation $R2_B$ in the blue wavelength range so that the retardation $R2_B$ becomes the same as the retardation R1 of the liquid crystal layer 5 at the standard wavelength of blue light (450 nm). Note that the blue, green, and red wavelength ranges are defined as 400 nm to 500 nm, 500 nm to 600 nm, and 600 nm to 700 nm, respectively. As a result, the retardation R2 comes close to the retardation R1 over the visible band, even if the wavelength dependences of the birefringence values $\Delta n1$ and $\Delta n2$ are different from each other.

For the purpose of improving the optical characteristics in the long wavelength side, the thickness d2 of the retardation compensation film 8 for red may be increased to obtain the retardation $R2_R$ in the red wavelength range so that the retardation $R2_R$ is the same as the retardation R1 of the liquid crystal layer 5 at the standard wavelength of red light (650 nm). To change the thickness d2 in accordance with corresponding primary color is suitable for mass production because it is not necessary to change the birefringence value $\Delta n2$ that depends on the optical structure of the retardation compensation film 8.

The ECB type liquid crystal device 2 exhibits the nature of a positive c-plate in terms of crystal optics, because most of the ECB type liquid crystal molecules align perpendicular to the substrate when no voltage is applied. When the polarizer and the analyzer are in cross nicol configuration to exhibit the black state at the time of no applied voltage, optical anisotropy appears in the liquid crystal layer 5 in the thickness direction.

The retardation compensation film 8 with alternatively layered high and low refractive index thin films works as a c-plate, although negative, like the ECB type liquid crystal device. Thus, the coefficient $\alpha$ of the phase retardation P1 ($=\alpha \cdot \Delta n1 \cdot d1$) is regarded as 1. Accordingly, the parameters may be determined to satisfy the equation ($\Delta n1 \cdot d1 = \Delta n2 \cdot d2$), that is, to equate the retardation R1 of the liquid crystal layer 5 and the retardation R2 of the retardation compensation film 8.

In the TN type liquid crystal, certain voltage is applied to align the elongated liquid crystal molecules perpendicular to the substrates. However, not all of the liquid crystal molecules near the substrates align perpendicularly. In the black state, 60% to 95%, or 65% to 80% of the liquid crystal molecules align perpendicular to the substrate. Accordingly, it is necessary to decide the parameters by considering that the phase shift P1 of the liquid crystal layer 5 becomes smaller than the value $\Delta n1 \cdot d1$. To make it simple, the coefficient $\alpha$ is assumed to be 0.7. In that case, the parameters of the retardation compensation film 8 needs to satisfy the equation $0.7 \times \Delta n1 \cdot d1 = \Delta n2 \cdot d2$. Note that the OCB (Optically Compensatory Bend) type and STN (Super Twisted Nematic) type liquid crystal also have the similar characteristics.

The retardation compensation film 8 is formed from durable inorganic material. As an example, the retardation compensation film 8 is composed of high and low refractive index thin films that are alternatively layered.

The wavelength dependence U2 of the birefringence value Δn2 of the retardation compensation film is defined as follows:

$$U2 = \{\Delta n2_{(450)} - \Delta n2_{(650)}\}/\Delta n2_{(550)}$$

In the above equation, $\Delta n2_{(450)}$, $\Delta n2_{(550)}$ and $\Delta n2_{(650)}$ indicate respectively the birefringence value of the retardation compensation film corresponding to the standard wavelength of blue light (450 nm), green light (550 nm) and red light (650 nm). Wavelength dependence U2 of an inorganic retardation compensation film is 1.10 to 1.50. Similarly, wavelength dependence U1 of birefringence Δn1 of the liquid crystal layer is defined as follows. In general, the wavelength dependence U1 is 1.05 to 1.20.

$$U1 = \{\Delta n1_{(450)} - \Delta n1_{(650)}\}/\Delta n1_{(550)}$$

Ideally, the condition U1=U2 is satisfied over the visible band. The value U1 does not change largely because limited kinds of the liquid crystal molecules are practically available. Thus, the retardation compensation film is designed so as to make the wavelength dependence U2 closer to U1. The wavelength dependence U2 depends upon the material of the thin film layers of the retardation compensation film. In addition, it is possible to correct the retardation by adjusting the thickness d2 at a specified wavelength.

Accordingly, high and low refractive index materials for the high and low refractive index thin films are selected so as to make the wavelength dependence U2 of the phase compensation film as close as possible to the wavelength dependence U1 of the liquid crystal layer. Then, the thickness d2 of the retardation compensation film is adjusted to compensate the retardation in the visible band. Note that if the wavelength dependences U1 and U2 are the same, retardation over the visible band is properly compensated by adjusting the thickness d2. With high and low refractive index materials currently available, however, the wavelength dependences U1 and U2 can not be the same. Nonetheless, since the three-plate type liquid crystal projector adopts separate color channels for three primary colors, it is possible to adjust the thickness d2 of the retardation compensation film for each color channel.

The major reason why the wavelength dependences U1, U2 are different is that the wavelength dependences of the refractive indices of high and low refractive index materials are different. Especially, the wavelength dependence becomes large as the refractive index increases, especially in the short wavelength range. Moreover, the wavelength dependence varies upon the condition to deposit the thin film layer. Although it is possible to decrease the wavelength dependence by selecting the material with small refractive index, the birefringence value Δn2 of the retardation compensation film also becomes small. In that case, large thickness d2 is required to obtain a designed retardation R2, which is disadvantageous in productivity. In consideration of the explanations above, the preferred embodiments will be described with reference to the drawings.

BRIEF DESCRIPTION OF THE DRAWINGS

The above objects and advantages of the present invention will become easily understood by one of ordinary skill in the art when the following detailed description would be read in connection with the accompanying drawings, in which:

FIG. 13 is a table showing wavelength dependence of an ECB liquid crystal device;

FIG. 14 is a table showing wavelength dependence of a retardation compensation film (2) for the ECB liquid crystal device;

PREFERRED EMBODIMENTS OF THE INVENTION

Figure 5:
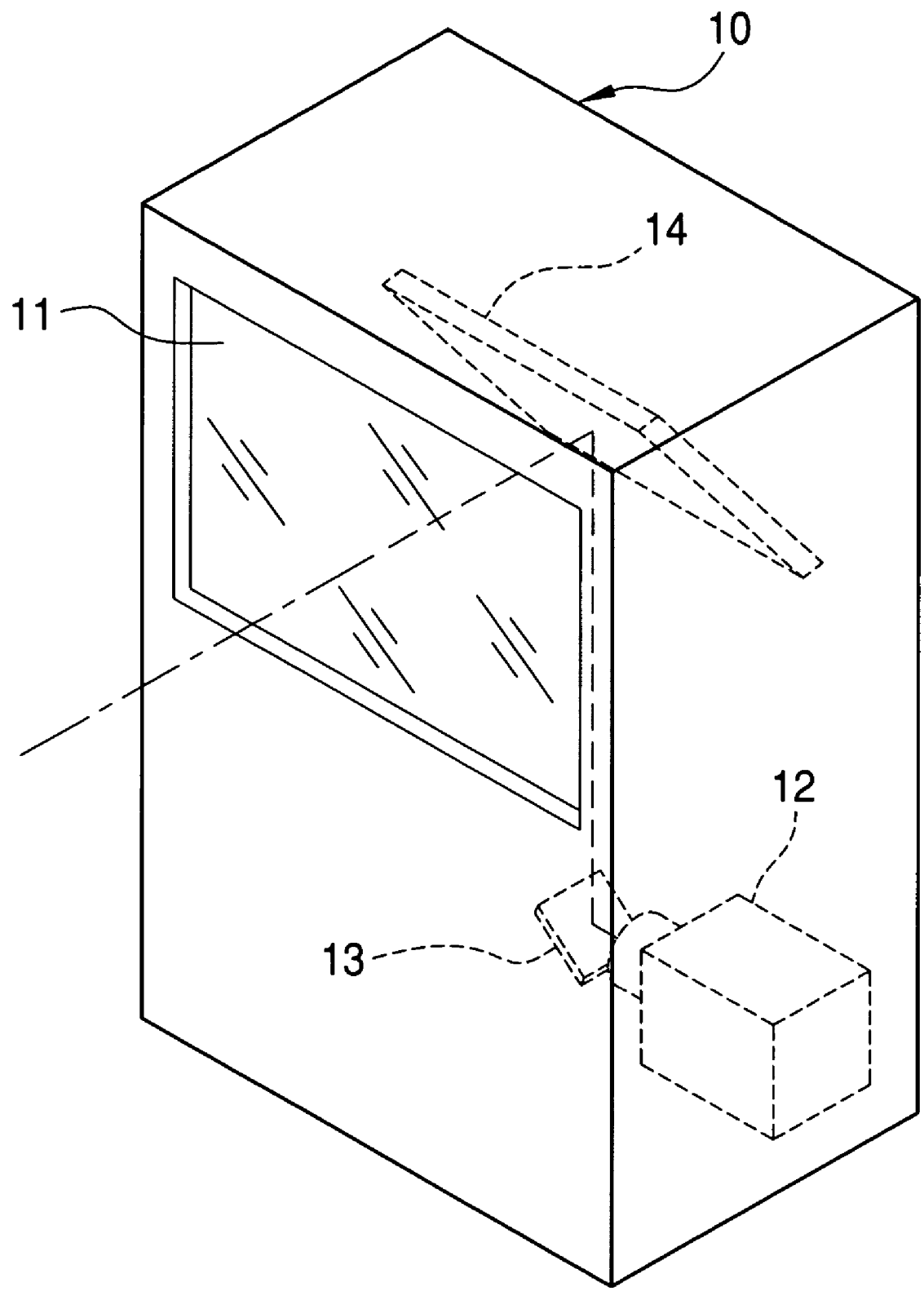
FIG. 5 is a front perspective view of a liquid crystal projector of rear projection type.

A liquid crystal projector of rear projection type is depicted in FIG. 5. A diffuse transmissive screen 11 is provided in the front side of a housing 10 of the liquid crystal projector. An image projected from the rear side of the screen 11 is observed from the front side thereof. The image projected by an image projection unit 12 with a liquid crystal device, assembled in the housing 10, is reflected on the mirror 13, 14 and focused on the rear side of the screen 11. The liquid crystal projector may be used as a wide screen television by incorporating well-known electrical circuits such as a tuner circuit, a video/sound signal reproduction circuit. In that case, the reproduced video images are displayed on the liquid crystal device of the image projection unit.

Figure 6:
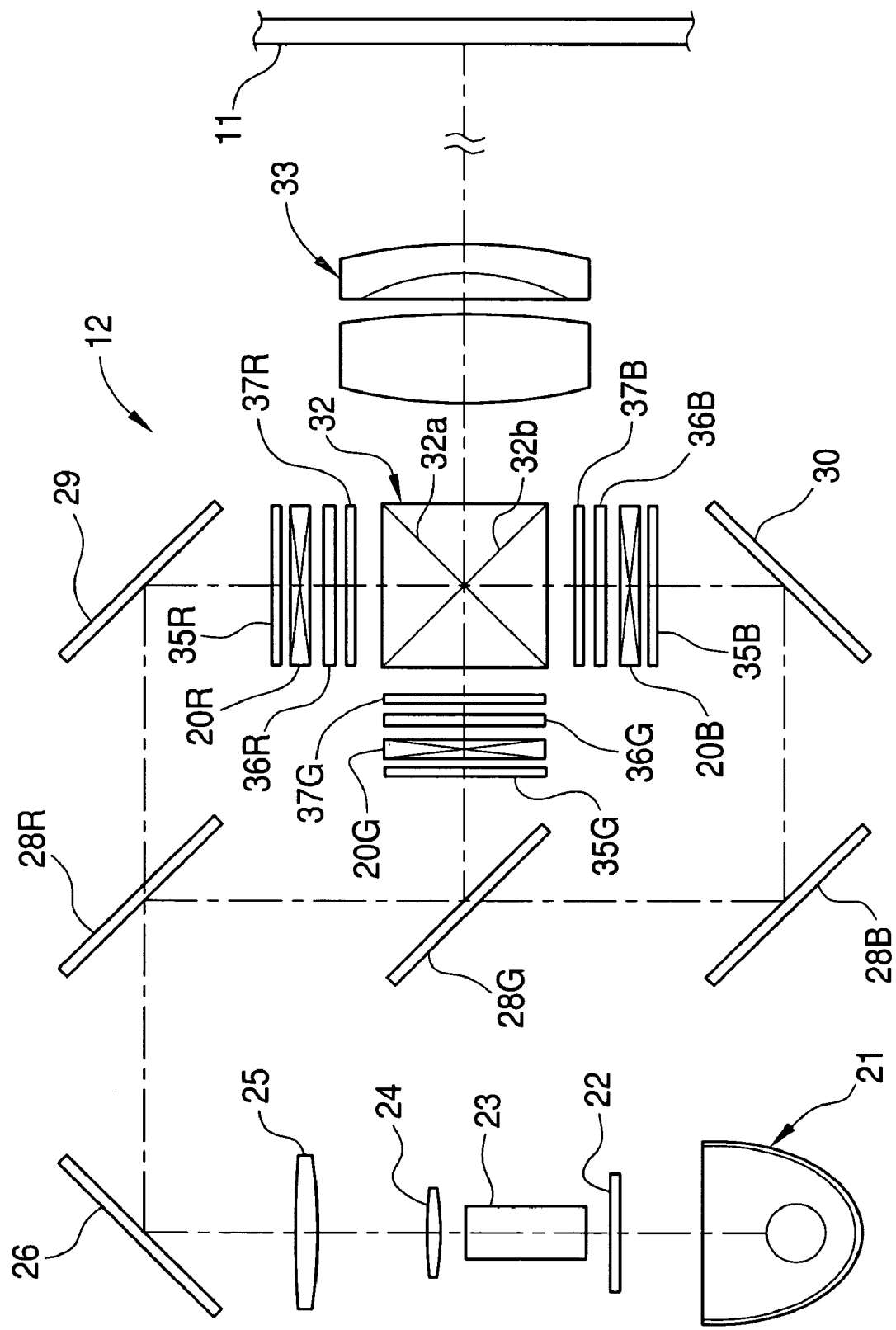
FIG. 6 is a block diagram showing an optical system of the liquid crystal projector with transmissive liquid crystal devices.

As shown in FIG. 6, the image projection unit 12 has three transmissive liquid crystal devices for red, green, blue images 20R, 20G, 20B to project a full color image onto the screen 11. Emission light from a light source 21 becomes white light including red, green and blue light by a cut filter 22 to cut ultraviolet and infrared components. White light goes along an illumination light axis (one dotted line in the drawing) and enters a glass rod 23. Since the incident plane of the glass rod 23 is located in the vicinity of the focal position of the parabolic reflector of the light source 21, white light from the cut filter 22 enters the incident plane of the glass rod 23 without having large loss.

After passing through the glass rod 23, white light is collimated by a relay lens 24 and a collimate lens 25. Collimated white light is reflected on a mirror 26 toward a dichroic mirror 28R that passes red light and reflects blue and green light. The liquid crystal device for red image 20R is illuminated from behind by red light that is reflected on a mirror 29. Blue and green light, reflected on the dichroic mirror 28R, reaches a dichroic mirror 28G in which only green light is reflected. Green light reflected on the dichroic mirror 28G illuminates the liquid crystal device for green image 20G from behind. Blue light, reflected on mirrors 28B, 30, illuminates the liquid crystal device for blue image 20B from behind.

Each of the liquid crystal devices 20R, 20G, 20B contains a same TN liquid crystal layer and displays red, green and blue density images. Red, green and blue light through the liquid crystal devices 20R, 20G, 20B becomes red, green and blue image light, respectively. A color recombining prism 32 is located at the position where the optical distances from the center of the color recombining prism 32 to the liquid crystal devices 20R, 20G, 20B are the same. A projection lens system 33 is located in the light emission surface side of the color recombining prism 32. The color recombining prism 32 has two dichroic planes 32a, 32b to reflect red light and blue image light respectively, so that red, green and blue image light is mixed into full color image light. Full color image light enters the projection lens system 33. The object side focal point of the projection lens system 33 is on the emanation planes of the liquid crystal devices 20R, 20G, 20B. The image side focal point of the projection lens system 33 is on the screen 11. Thus, full color image light from the color recombining prism 32 is focused on the screen 11 by the projection lens system 33. Note that the mirrors 13, 14 in FIG. 5 are omitted for the purpose of simplification of the drawing.

Front polarizing plates 35R, 35G, 35B as the polarizers are respectively provided in front of the incident planes of the liquid crystal devices 20R, 20G, 20B. Retardation compensators 36R, 36G, 36B and rear polarizing plates 37R, 37G, 37B as the analyzers are arranged in the emanation plane side of the liquid crystal devices 20R, 20G, 20B. The polarization directions of the front polarizing plates 35R, 35G, 35B and the rear polarizing plates 37R, 37G, 37B are perpendicular to each other (cross nicol configuration). The operations of the polarizing plates and the retardation compensators for red, green and blue channels are basically the same, regardless of the insignificant difference based on the difference in wavelength.

Figures 7, 8:
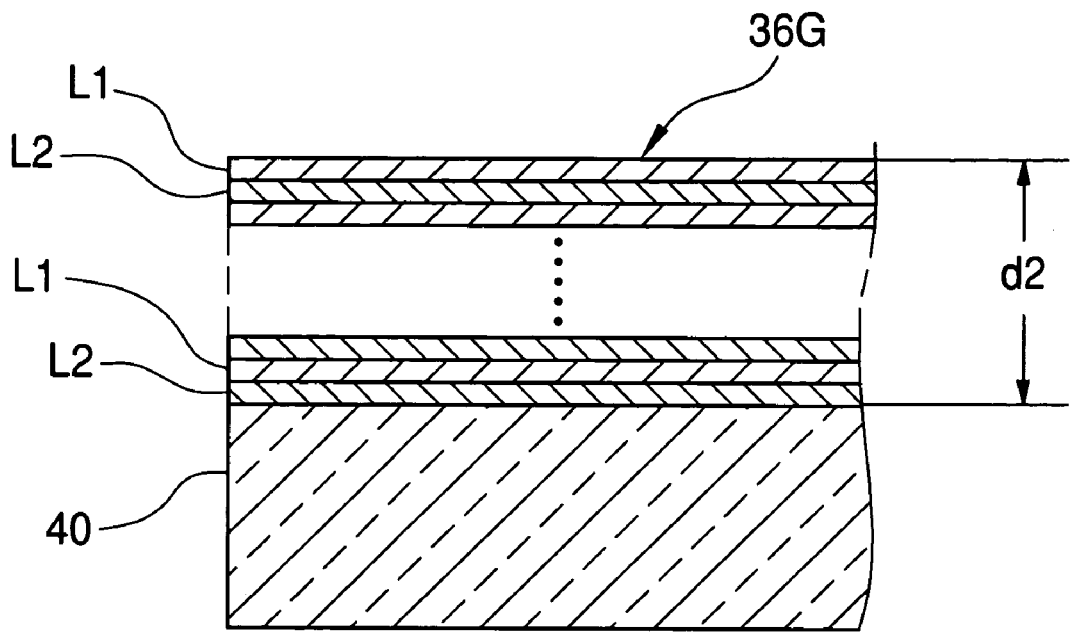
FIG. 7 is a schematic cross section of an example of the retardation compensator.
FIG. 8 is a table showing wavelength dependence of a TN liquid crystal device.

As shown in FIG. 7, the retardation compensator for green 36G is an inorganic form birefringence layer that has the thickness d2, and comprises plural dielectric thin films L1, L2 that are alternatively layered on the transparent glass substrate 40. The refractive indices of the thin films L1, L2 are different from each other. The optical thickness (the product of the physical thickness and the refractive index) of each thin film is smaller than the wavelength λ of incident light. The optical thickness of each thin film is preferably from λ/100 to λ/5, more preferably from λ/50 to λ/5, and practically from λ/30 to λ/10. Thereby, the retardation compensator 36G exhibits negative birefringence of the c-plate (uniaxial birefringence plate with the negative birefringence value Δn2). The retardation compensator 36G is utilized by locating in the projector in such a way that the surfaces of the thin films are normal to the optical axis of the projection optical system.

As for the examples of the optical devices with plural dielectric layers, a dichroic mirror, a polarization beam splitter, a color composition prism and anti-reflection coating are well known. The optical thickness of each layer is designed to be integer multiplication of λ/4 so that the optical devices exhibit optical interference. On the other hand, the optical thickness of each film is less than λ/4. Moreover, the optical thickness of each film is controlled to obtain a desired birefringence value Δn. Thus, it is clear that the retardation compensator exhibits different optical function from other optical devices.

In the same manner as the retardation compensator for green 36G, each of the retardation compensator for red and blue 36R, 36B has a form birefringence layer in which plural dielectric thin films L1, L2 are alternately layered on the transparent glass substrate 40. The thin films L1, L2 are formed from the same material, but have different refractive indices. The retardation compensator 36B for blue channel has a thickness less than d2. It is possible to decrease the thickness by decreasing the number of the thin film layers L1, L2, or by reducing the thickness of each thin film layer L1, L2.

Each of the retardation compensators 36R, 36G, 36B exhibits negative retardation compensation function to incident light of corresponding color, so that elliptically polarized incident light is changed into linearly polarized light. Due to the retardation compensation, the rear polarizing plate 37R, 37G, 37B can decrease intensity of corresponding color light. Thus, it is possible to increase the black density in the pixel image when a voltage is applied to the liquid crystal devices 20R, 20G, 20B.

Because of wavelength dependency in the birefringence value of the liquid crystal devices 20R, 20G, 20B, it is not possible to compensate the phase retardation, especially of blue light, effectively if the retardation compensators 36R, 36G, 36B have the same structure. Since the thickness of the retardation compensator for blue 36B is thinner than those for green and red 36G, 36R, positive phase retardation of the blue light caused by the liquid crystal device for blue 20B is effectively compensated. Therefore, it is possible to compensate the phase retardation over the visible band. Embodiments of the retardation compensators 36R, 36G, 36B will be explained below.

[Embodiment 1]

Figure 1:
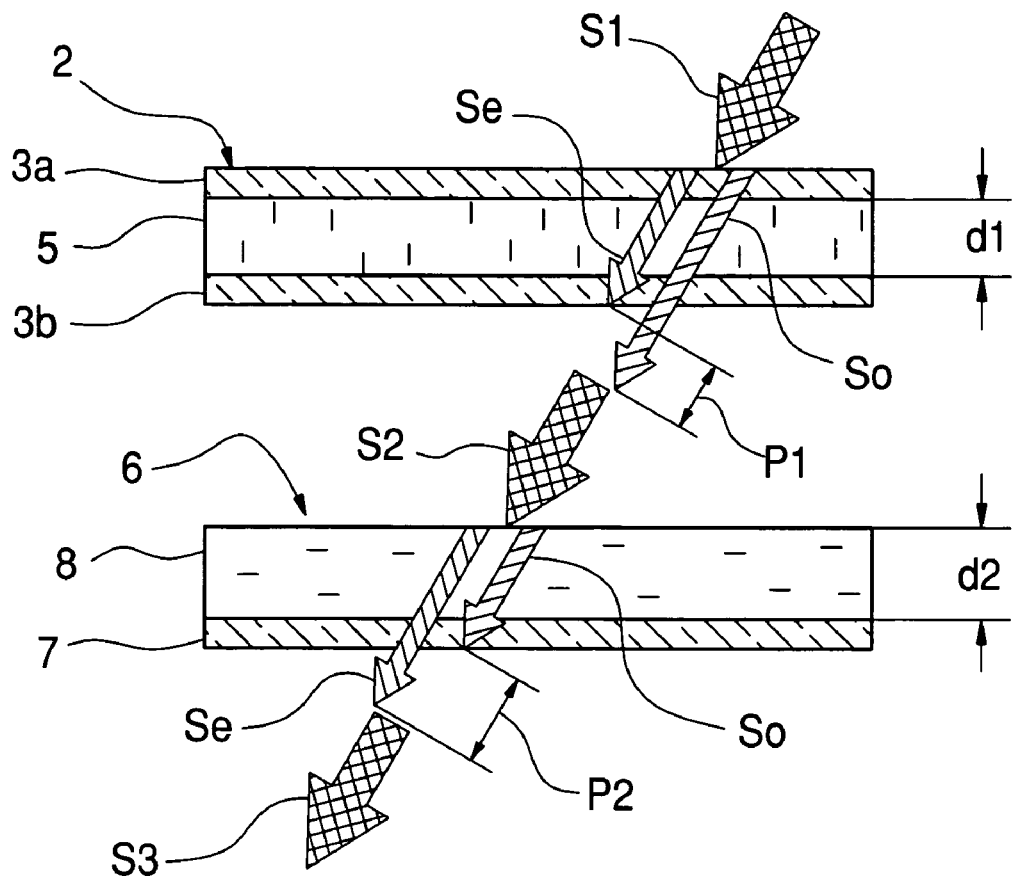
FIG. 1 is an explanatory view of the retardation in the liquid crystal device and the retardation compensator.
Figure 2:
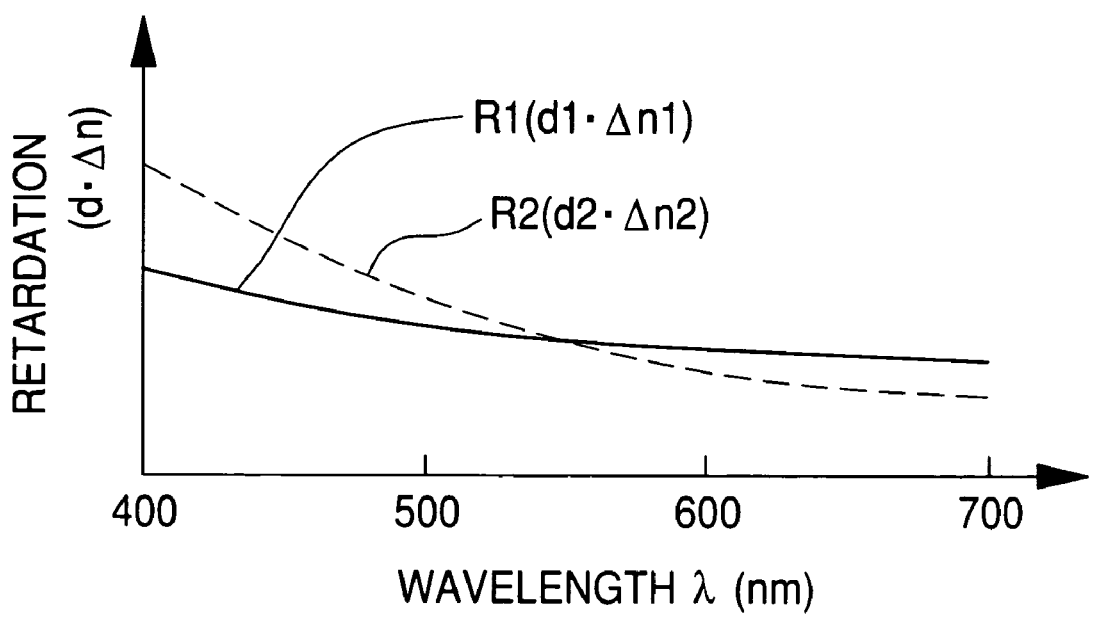
FIG. 2 is a graph showing wavelength dependence of retardation of the liquid crystal device and the retardation compensator.
Figure 3:
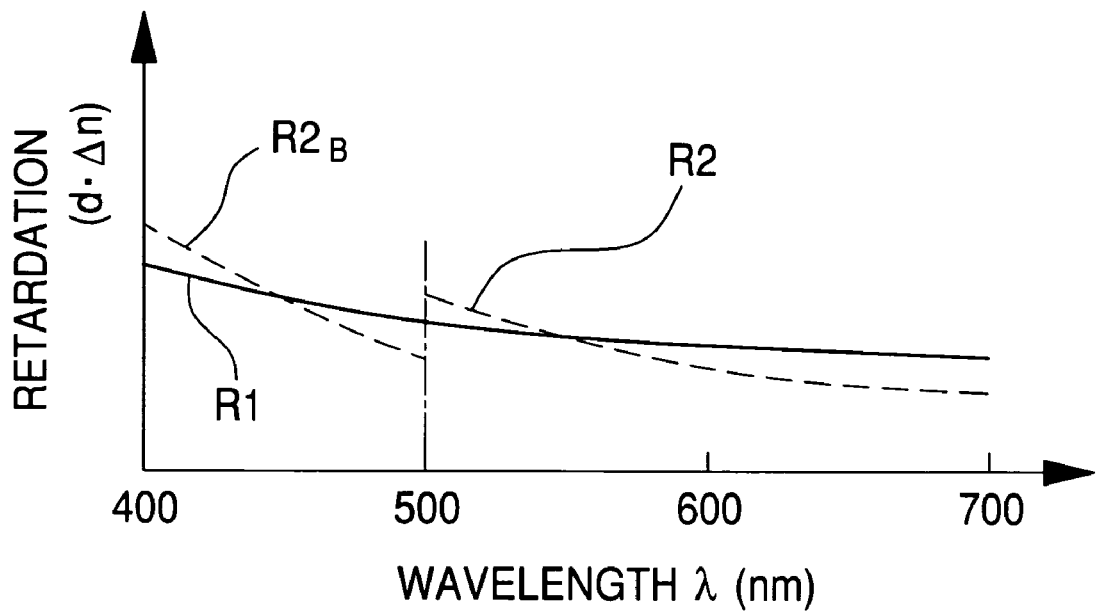
FIG. 3 is a graph of the wavelength dependence in which the retardation in blue wavelength range is adjusted.
Figure 4:
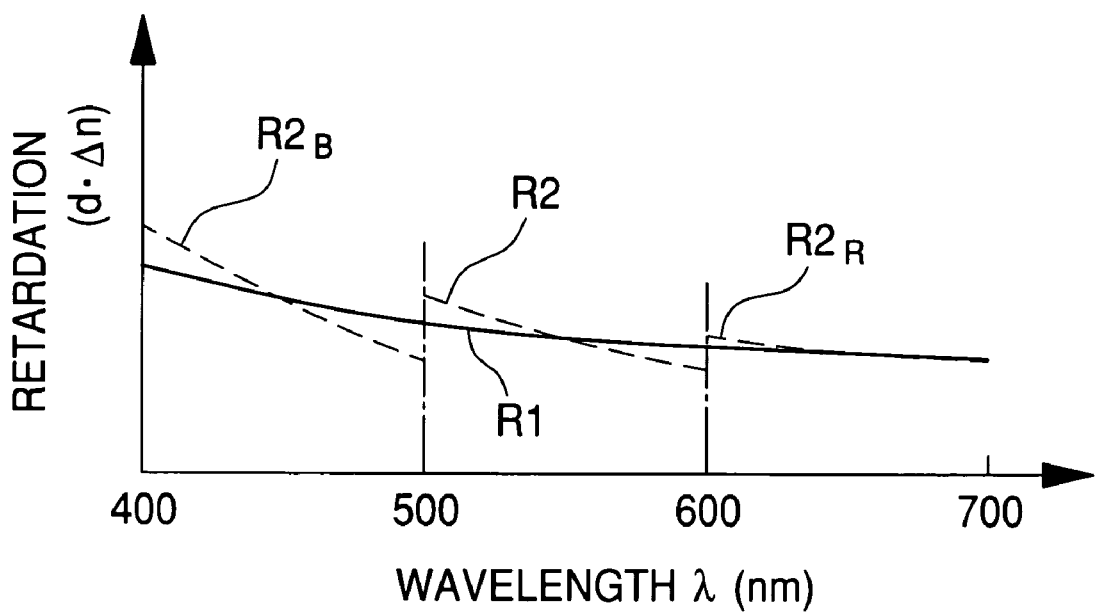
FIG. 4 is a graph of the wavelength dependence in which the retardation in blue and red wavelength ranges is adjusted.

As shown in FIG. 8, the retardation d·Δn of nematic liquid crystal material for the TN liquid crystal device has wavelength dependence. Note that the thickness d of the TN liquid crystal device (corresponding to d1 of the liquid crystal layer 5 in FIG. 1) is 4.5 μm. Since all of the liquid crystal molecules in a black state pixel do not orientate perpendicularly, as mentioned above, it is assumed that 70% of the liquid crystal molecules in thickness d cause effective retardation Re to be compensated. The effective retardation Re, calculated by 0.7×d·Δn, is also listed in FIG. 8.

In this embodiment, the liquid crystal device contains cyanocyclohexanes nematic liquid crystal, known as "ZLI-1083" (Trade Name) manufactured by Merck Ltd. The rate of the liquid crystal molecules to cause the effective retardation is not limited to 70%, but may be decided appropriately in accordance with composition and kind of the liquid crystal molecules, applied voltage to the substrates and orientation distribution of the liquid crystal molecules in the liquid crystal device.

Figures 9, 10:
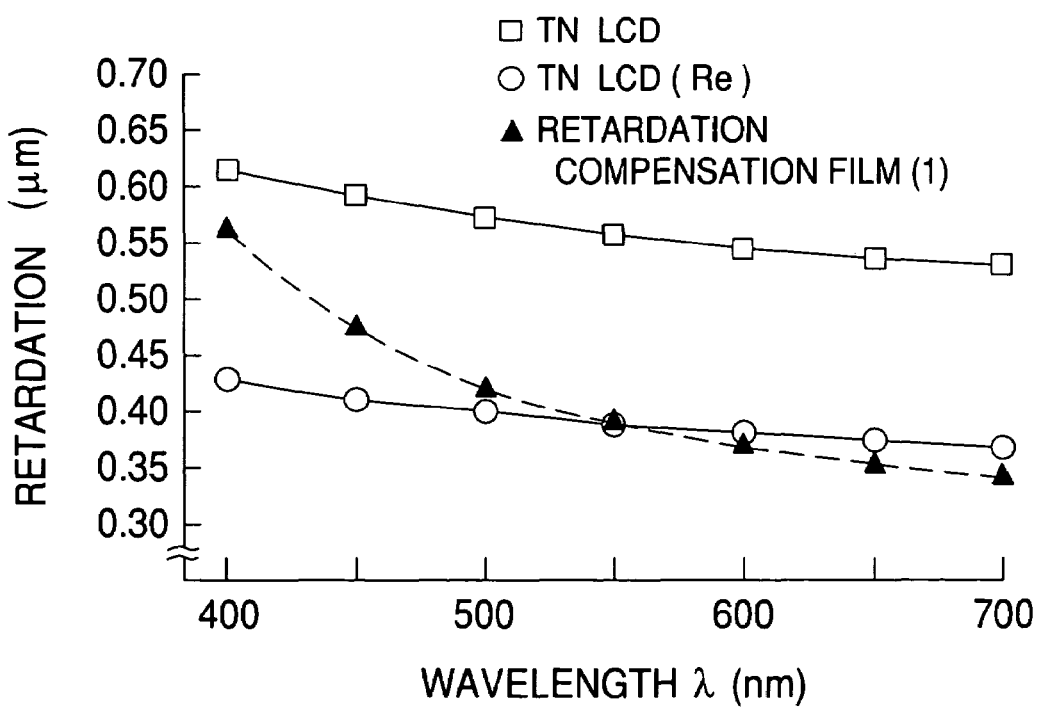
FIG. 9 is a table showing wavelength dependence of a retardation compensation film (1) for the TN liquid crystal device.
FIG. 10 is a graph showing retardation characteristics of the TN liquid crystal device and the retardation compensation film (1)

In order to adapt the wavelength dependence of the effective retardation Re, the retardation compensation film (1) according to this embodiment is composed of 40 $TiO_2$ films and 40 $SiO_2$ films that are alternatively layered on a substrate. The $TiO_2$ film is used as the high refractive index layer, whereas The $SiO_2$ film is used as the low refractive index layer. The physical thickness of the $TiO_2$ film and $SiO_2$ film is 30 nm and 20 nm (thickness ratio is 3:2), respectively. The physical thickness of the retardation compensation film (1) is 2 um in total. As shown in FIG. 9, the refractive indices the $TiO_2$ film and $SiO_2$ film have wavelength dependence. The measured birefringence Δn of the retardation compensation film (1) has its own wavelength dependence.

The optical thickness of the $TiO_2$ film (physical thickness: 30 nm) is 76.6 nm even at the wavelength of 400 nm with large refractive index. In addition, the optical thickness of the $SiO_2$ film (physical thickness: 20 nm) is 29.6 nm at the wavelength of 400 nm. Both optical thicknesses satisfy the condition (λ/5 or less). This condition is satisfied at the blue standard wavelength 450 nm and the standard wavelength of other primary colors. Thus, the thin films can exhibit optical anisotropy, needed for compensating retardation, with a structure different from an ordinary interferential thin film in which the optical thickness is integer multiplication of λ/4. On the other hand, when the optical thickness of each thin film is less than λ/100, the number of the thin films increases to obtain the desired thickness d. This is not practical because of low productivity.

The measured birefringence value Δn of the retardation compensation film (1) of the above structure will be compared with the theoretical value based on the theory of the form birefringence. It is assumed that a retardation compensation film has two kinds of thin films, with the physical thickness a, b and the refractive index $n_1$, $n_2$, alternatively layered at the period of (a+b). When electromagnetic wave perpendicularly enters the layered surface, the retardation compensation film does not exhibit birefringence effect because the electromagnetic wave has only TE (Transverse Electric) component in which the electric component oscillates in the plane parallel to the layered surfaces. On the other hand, in the event that electromagnetic wave obliquely enters the layered surface, the retardation compensation film exhibits two kinds of refractive indices shown by the following equations.

$$N_{TE} = \{(an_1^2 + bn_2^2)/(a+b)\}^{1/2}$$

$$N_{TM} = \{(a+b)/(a/n_1^2 + b/n_2^2)\}^{1/2}$$

In the above equation $N_{TE}$ is effective refractive index of the retardation compensation film to the TE component, and $N_{TM}$ is effective refractive index to TM component in which the electrical component oscillates in the plane perpendicular to the layered surfaces. The difference between $N_{TE}$ and $N_{TM}$ causes birefringence of the retardation compensation film. The theoretical birefringence value Δn is defined as follows:

$$\Delta n = N_{TM} - N_{TE}$$

Referring to FIG. 9, it is clear that the theoretical birefringence value Δn is substantially the same as the measured value.

Retardation d·Δn of the retardation compensation film (1) is defined as the product of the birefringence value Δn and the thickness d (=2 μm) of the retardation compensator. Because of the wavelength dependence of the birefringence value Δn, retardation of the retardation compensation film (1) changes according to the wavelength of incident light. Note that the refractive index column in FIG. 9 shows that $TiO_2$ film has more influential to the wavelength dependence of the birefringence value Δn than $SiO_2$ film.

The graph in FIG. 10 shows the wavelength dependences of the retardation d·Δn (shown by the marks □) and effective retardation Re (○) of the TN liquid crystal device, and the retardation d·Δn (Δ) of the retardation compensation film (1). The retardation compensation film (1) can compensate retardation more effectively as the retardation (Δ) thereof becomes closer to the effective retardation Re (○). According to the graph in FIG. 10, the retardation compensator (1) exhibits good optical property in the wavelength range of 500 nm to 700 nm. The retardation of the retardation compensation film (1), however, is too much at the wavelength of 500 nm or less. Accordingly, when the retardation compensation films (1) for blue, green and red light have the same thickness d, the retardation of blue light is not compensated sufficiently.

In order for obtaining enough compensation without changing the birefringence value Δn of the retardation compensation film (1), the total thickness d of the retardation compensation film (1) for blue light is adjusted so that the retardation (Δ) becomes the same as the effective retardation (○) of the liquid crystal device at the standard wavelength of blue light (450 nm). It is also possible to exhibit better retardation compensation of red light by increasing the total thickness d of the retardation compensation film (1) for red light so that the retardation (Δ) becomes the same as the effective retardation (○) of the liquid crystal device at the standard wavelength of red light (650 nm).

Figures 11, 12:
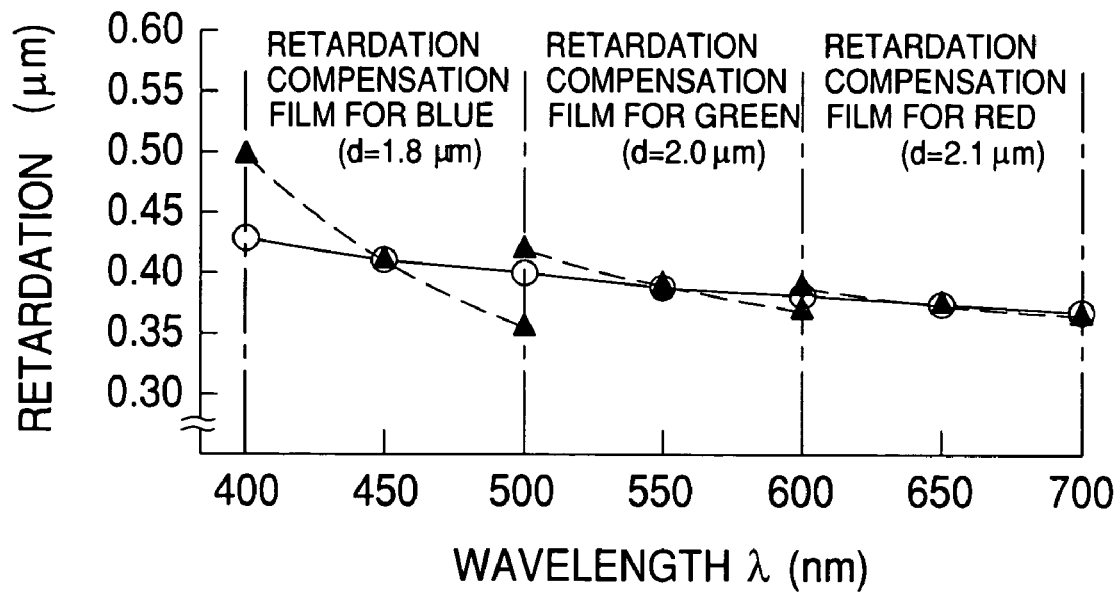
FIG. 11 is a graph showing retardation characteristics of improved retardation compensation film (1)
FIG. 12 is a table of the parameters of the improved retardation compensation film (1)

FIG. 12 shows the parameters of improved retardation compensation films. Although the retardation compensation film has same layered structure, the total thickness thereof is adjusted according to the color of the incident light. More specifically, the thickness of the retardation compensation films for blue, green and red are 1.8 μm, 2.0 μand 2.1 μm, respectively. Thereby, the retardation compensation films (1) with different retardation d·Δn according to the color can exhibit better result in compensating retardation.

The birefringence value Δn of the retardation compensation film depends on the refractive indices $n_1$, $n_2$, and the physical thickness of each thin film. Thus, in adjusting retardation of the retardation compensation films for three primary colors, it is preferable to making the birefringence value Δn of the retardation compensation film constant by fixing the physical thickness of the $TiO_2$ films and $SiO_2$ films. In that case, the retardation of the retardation compensation film is decided in accordance with the number of the thin films (equivalent to the total thickness d of the retardation compensation film). In this embodiment, the retardation compensation films for blue, green, red light have 72, 80, 82 thin film layers, respectively. The retardation (▲) of the retardation compensation film for green light is substantially the same as the effective retardation (○) of the liquid crystal device in the wavelength range between 500 nm to 700 nm. Thus, it is also possible to compensate the retardation over the visible band by two kinds of the retardation compensation films by utilizing the retardation compensation film for green light to compensate retardation of red incident light.

Based on the above description, the thickness of the retardation compensation films for blue, green and red light is designed. Then, three kinds of the retardation compensation films, prepared by vacuum deposition on glass substrates, are closely fixed to the emanation side substrate of TN liquid crystal devices of corresponding color channel. For the purpose of comparing the liquid crystal projector according to this embodiment with a conventional one, black images are displayed on a screen by inputting image data to show the black state for three standard colors.

The black image projected by the conventional liquid crystal projector includes some blue component, whereas the black image by the liquid crystal projector with the retardation compensation system according to the present embodiment is not colored at all. In the event that blue gradation images are displayed, the intensity of the low intensity image becomes lower than the one projected by the conventional liquid crystal projector. Moreover, the liquid crystal projector with the retardation compensation system according to the present embodiment is able to display the gradation more clearly than the conventional one.

The contrast ratio between the white image and the black image of the liquid crystal projector according to the present embodiment is improved to 700:1, compared to the contrast ratio of the conventional liquid crystal projector (500:1). Accordingly, the retardation compensation system of the present embodiment can improve the power of expression especially in the low brightness range, and increase the contrast of the projected image by darkening the black pixel image.

[Embodiment 2]

The retardation compensation film (2) according to this embodiment is combined with the ECB liquid crystal device. As shown in the parameters in FIG. 13, the ECB liquid crystal device with the thickness of 4.5 μm has wavelength dependence in the retardation d·Δn. Since the phase retardation of the ECB liquid crystal device is caused by the wavelength dependence of the retardation d·Δn, the retardation of the retardation compensation film may be decided.

FIG. 14 shows the parameters of the retardation compensation film (2) for the ECB liquid crystal device. $TiO_2$ films as the high refractive index layer and $SiO_2$ films as the low refractive index layer are adapted for the liquid crystal compensation film (2). The thickness of the liquid crystal compensation film is designed so that retardation thereof is the same as the retardation (0.558 nm) of the ECB liquid crystal device at the wavelength of 500 nm. In order to achieve this, the thickness of the $TiO_2$ film and the $SiO_2$ film is 30 nm and 20 nm, respectively (the thickness ratio is 3:2), and 58 layers of the $TiO_2$ film and 58 layers of the $SiO_2$ film are alternatively layered to obtain the total thickness d of 2.9 μm (116 layers in total). Since the birefringence value Δn of the retardation compensation film (2) is the same as that according to the previous embodiment, the retardation d·Δn is obtained by the product of the birefringence value Δn and the thickness d (=2.9 μm).

Figure 15:
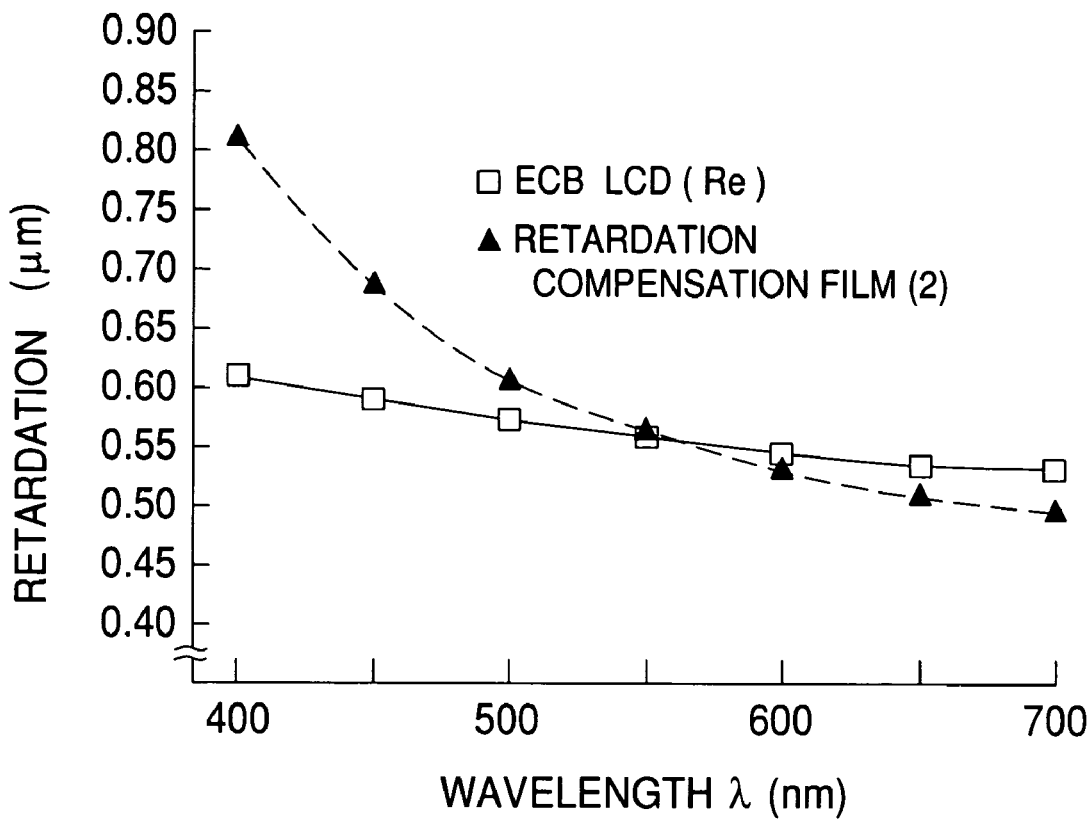
FIG. 15 is a graph showing retardation characteristics of the ECB liquid crystal device and the retardation compensation film (2)

In the graph of FIG. 15, the retardation of the retardation compensation film (2) is plotted with the mark (Δ), and the retardation of the ECB liquid crystal device is plotted with the mark (□). The graph in FIG. 15 shows that the retardation compensation film (2) performs too much retardation compensation as the wavelength becomes short, and does not perform enough retardation compensation as the wavelength becomes long. Thus, the total thickness d of the retardation compensation film (2) for blue light is adjusted so that the retardation (▲) becomes the same as the retardation (□) of the liquid crystal device at the standard wavelength of blue light (450 nm). Moreover, the total thickness d of the retardation compensation film (2) for red light is adjusted so that the retardation (▲) becomes the same as the retardation (□) of the liquid crystal device at the standard wavelength of red light (650 nm).

Figure 16:
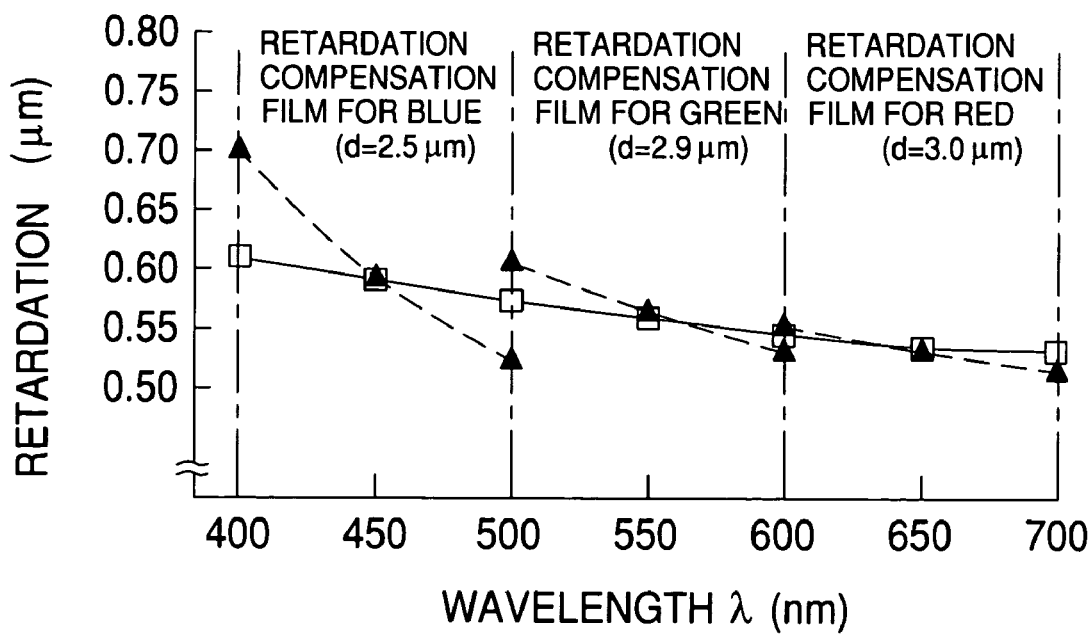
FIG. 16 is a graph showing retardation characteristics of improved retardation compensation film (2)
Figures 17, 18:
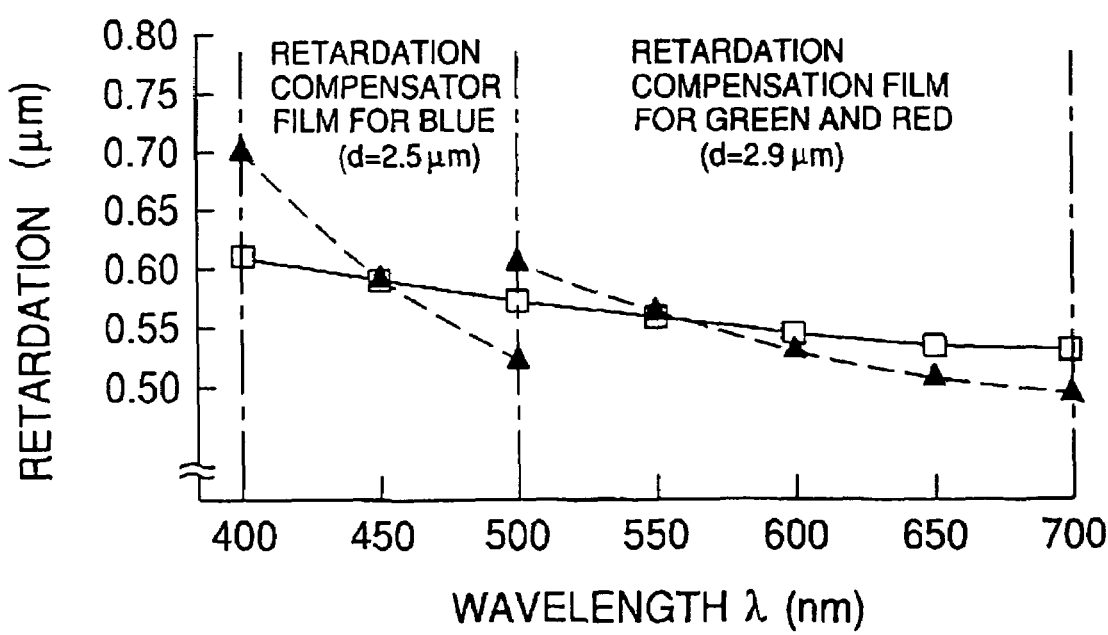
FIG. 17 is a table of the parameters of the improved retardation compensation film (2)
FIG. 18 is a graph showing retardation characteristics of another embodiment of improved retardation compensation film (2)

As shown in FIG. 17, the thickness of the retardation compensation films for blue and red are 2.5 μm (100 layers in total) and 3.0 m (120 layers in total), respectively. By changing the thickness of the retardation compensation films (2) according to the color, it is possible to improve the characteristics of the retardation compensator in the visible band, as shown in FIG. 16. Because of small difference in the retardation in the range of 500 nm to 700 nm, as shown in FIG. 18, the retardation compensation film for green light may be used to compensate retardation of red light. In that case, it is possible to increase the thickness of the retardation compensation film for green/red light so that the retardation thereof becomes the same as the retardation of the ECB liquid crystal device at 600 nm in wavelength.

Based on the above description, three kinds of the retardation compensation films, prepared by vacuum deposition on glass substrates, are closely fixed to the emanation side substrate of ECB liquid crystal devices of corresponding color channel. Then, black images displayed by the liquid crystal projector according to this embodiment and a conventional liquid crystal projector are compared. The black image projected by the conventional liquid crystal projector includes some blue component, whereas the black image by the liquid crystal projector with the retardation compensation system according to the present embodiment is not colored at all. In the event that blue gradation images are displayed, the intensity of the low intensity image becomes lower than the one projected by the conventional liquid crystal projector. Moreover, the liquid crystal projector with the retardation compensation system according to the present embodiment is able to display the gradation more clearly. The contrast ratio between the white image and the black image of the liquid crystal projector according to the present embodiment is improved to 800:1, compared to the contrast ratio of the conventional liquid crystal projector (1100:1). Accordingly, the retardation compensation system of the present embodiment can improve the power of expression especially in the low brightness range, and increase the contrast of the projected image by darkening the black pixel image.

These embodiments above show that the retardation compensation system according to the present invention improves contrast and color balance of the projected image. The retardation compensation system is characterized that the physical structure of the retardation compensation film for blue is different from those for other color channels. The physical structure varies by changing the material of the thin film, thickness of each thin film layer or the total thickness of the retardation compensation film. In the embodiments above, the total thickness is different according to the color by changing the number of high and low refractive index film layers.

The advantage of changing the total thickness is that the thickness and the material for high refractive index layers (low refractive index layers) are the same. Thus, it is possible to control the physical structure of the retardation compensation film easily by changing the number of the thin film layers. Accordingly, there is a strong advantage in mass production without decreasing the quality.

In designing the structure of the retardation compensation film, the birefringence value Δn may be changed according to the color by changing the ratio in thickness between high and low refractive index layers. It is also possible to change the combination of high and the low refractive index materials in accordance with the color.

The high and low refractive index thin film layers are deposited by use of deposition equipment, such as vacuum deposition equipment or sputter deposition equipment. The deposition equipment has shutters to shield the substrate from the source materials. The shutters are alternatively open and close while heating the deposition source materials, so that the two kinds of thin film layers are alternately deposited on the substrate. Instead of the shutters, the substrate may be held on a holder that moves the substrate at a predetermined speed. The thin film layers are alternatively deposited by passing the substrate above the heated source materials. As for the materials for inorganic thin film layers, any known materials for deposition may be utilized. Examples of the materials for the inorganic thin films are $TiO_2$, $SiO_2$, $ZrO_2$, $MgO$, $CeO_2$, $SnO_2$, $Ta_2O_5$, $Y_2O_3$, $LiNbO_3$, $MgF_2$, $CaF_2$ and $Al_2O_3$.

In the example of FIG. 6, the retardation compensator 36R, 36G, 36B is located between the emanation side of the transmissive liquid crystal device 20R, 20G, 20B and the polarizing plate 37R, 37G, 37B as the analyzer. The retardation compensator 36R, 36G, 36B may be located between the incidence side of the transmissive liquid crystal device 20R, 20G, 20B and the polarizing plate 35R, 35G, 35B as the polarizer.

Figure 19:
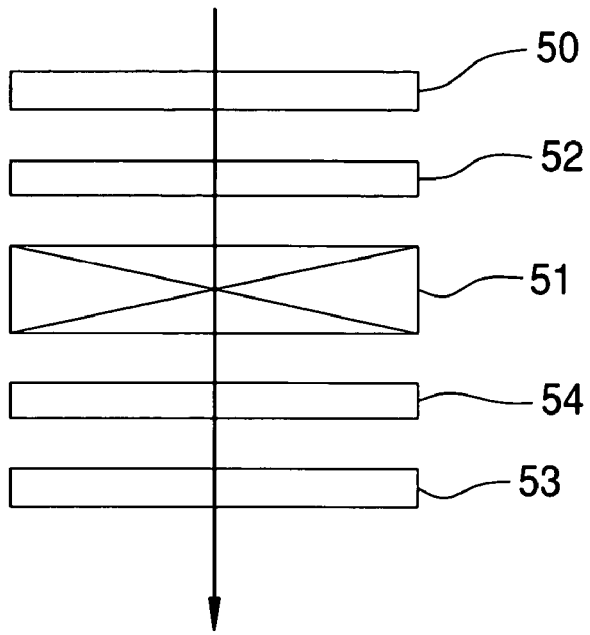
FIG. 19 is an explanatory view in which the retardation compensators are located in both sides of the liquid crystal device.

Two retardation compensators may be placed in a light path. As shown in FIG. 19, a first retardation compensator 52 is located between the polarizer 50 and the incident side surface of the liquid crystal device 51. A second retardation compensator 54 is also located between the emanation side surface of the liquid crystal device 51 and the analyzer 53. In the event of providing two retardation compensators, the retardation of the liquid crystal device 51 is compensated by the combination of two retardation compensators 52, 54. For instance, the thickness d of the retardation compensation films for the retardation compensators 52, 54 may be 1.5 μm respectively to realize the retardation compensation film (2) for red color. In order to achieve the same result, the thicknesses of the retardation compensation films may be separated into 1.0 μm and 2.0 μm, for instance.

Separating the retardation compensation film is advantageous in limiting the thickness of the single retardation compensation film. As the retardation compensation film becomes thick, depending upon the material to be deposited, cracks in the retardation compensation film increases or the defect rate becomes worse. Separating the retardation compensation film can solve such problems.

Figure 20A:
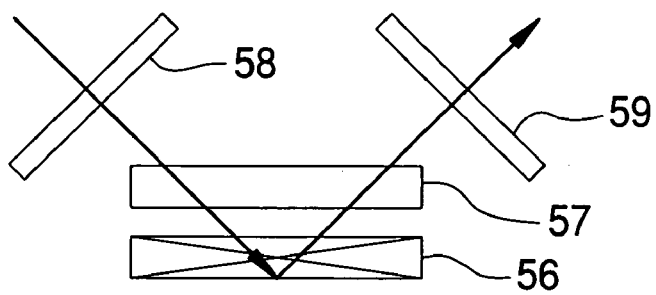
FIGS. 20A and 20B are explanatory view in which the liquid crystal device is located at an off-axis position (the position where the incidence optical axis and the emanation optical axis are different)

The retardation compensation system according to the present invention is also applicable to the liquid crystal projector with reflective liquid crystal devices. The reflective liquid crystal device comprises a mirror behind the liquid crystal layer, so that incident light passes through the liquid crystal layer twice. Thus, it is necessary to design the parameters of the retardation compensation in considering that the apparent thickness of the liquid crystal layer becomes double as the transmissive type. When the reflective liquid crystal device 56 is located at an off-axis position (the position where the incidence optical axis and the emanation optical axis are different), the retardation compensator 57 may be parallel to the liquid crystal device 56, as shown in FIG. 20A. In that case, incident light enters the liquid crystal layer and the retardation compensator 57 twice, so the parameters of the retardation compensation film are designed in consideration of actual thickness of the liquid crystal layer, in the same manner as the above embodiments.

Figure 20B:
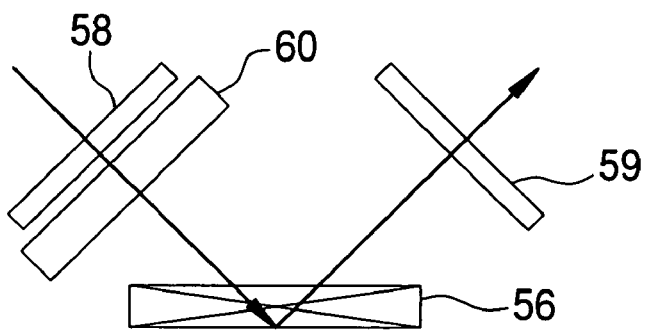

In FIG. 20B, the retardation compensator 60 may be located only in the incidence optical axis (or only in the emanation optical axis) of the reflective liquid crystal device 56. In this case, the parameters of the retardation compensation film are designed in consideration that the apparent thickness of the liquid crystal layer becomes double. In the event that a pair of the retardation compensators is positioned on the incidence and emanation optical axes of the liquid crystal device 56, the parameters of the retardation compensation film may be designed in consideration of actual thickness of the liquid crystal layer. Instead, it is possible to differentiate the parameters of two retardation compensation films in consideration that the apparent thickness of the liquid crystal layer becomes double.

The retardation compensation film described above is an example of a form birefringence as a negatively uniaxial c-plate. It is also possible to utilize an inorganic form birefringence shown in FIG. 21 as the retardation compensator to exhibit similar optical performance. The form birefringence 70 in FIG. 21 has plural transparent ridges 67 that are arranged substantially in parallel on the top surface 66a of the glass substrate 66. Each of the ridges 67, with the refractive index $n_A$, has a substantially rectangular parallelepiped shape.

The thickness S, the height h and the gap between adjacent two ridges 67 are sufficiently smaller than the wavelength λ of incident light. For instance, the optical thickness (the product of the thickness S and the refractive index $n_A$) of the form birefringence 70 is preferably from λ/100 to λ/5, more preferably from λ/50 to λ/5, and practically from λ/30 to λ/10. The optical isotropic axis 70a with no optical anisotropy extends in the direction parallel to the top surface 66a of the glass substrate 66. The form birefringence layer 70 exhibits the optical characteristics as a-plate, and located such that the top surface 66a of the glass plate 66 is perpendicular to the illumination or projection axis. The arrangement of the ridges 67 causes the refractive index distribution by air (=1) and the ridge 67 (=$n_A$) along the direction parallel to the optical isotropic axis 70a.

The birefringence Δn of the form birefringence 70 depends on the thickness S of the ridge 67 and the interval between adjacent ridges 67. The retardation of the form birefringence 70 is defined as h·Δn. Due to the wavelength dependence of the refractive index $n_A$ of the ridge 67, the birefringence value Δn has wavelength dependence as well. Thus, the retardation of the form birefringence 70 varies depending upon the wavelength, especially in the short wavelength side. In order to adjust the retardation, the height h of the ridge 67 may be changed according to the primary color.

The ridges on the glass substrate may not necessarily be perpendicular to the glass substrate. FIG. 22 shows an example of a form birefringence 72 with plural transparent ridges 71 that are inclined to the top surface 66a of the glass substrate 66. The optical isotropic axis 72a extends in the direction oblique to the top surface 66a of the glass substrate 66. The form birefringence 72 is located such that the top surface 66a of the glass plate 66 is perpendicular to the illumination or projection axis. Thus, the form birefringence 72 exhibits optical characteristics of a negatively uniaxial birefringent o-plate with its optical isotropic axis oblique to the top surface 66a of the glass substrate 66. In the same manner as the form birefringence 70 in FIG. 21, it is possible to adjust the retardation of the form birefringence 72 by changing the height h of the ridge 71 according to the primary color.

Figure 21:
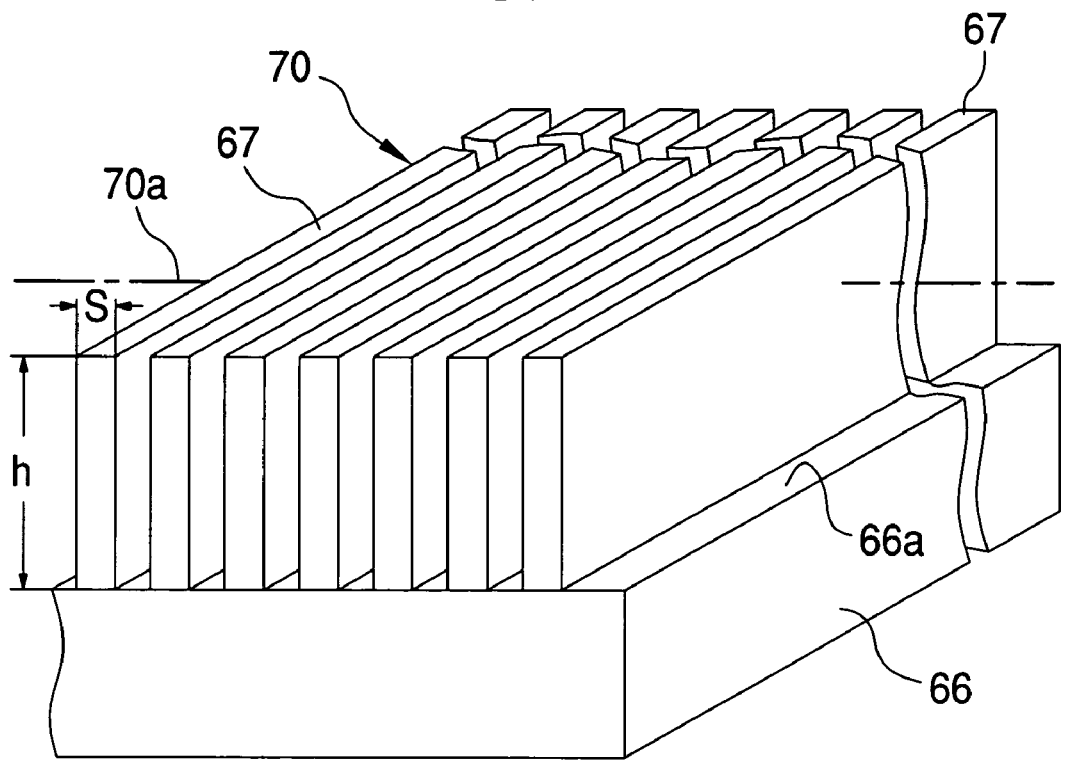
FIGS. 21, 22, 23, 24, 25 and 26 are schematic view of examples of form birefringence applicable to a retardation compensator.
Figure 22:
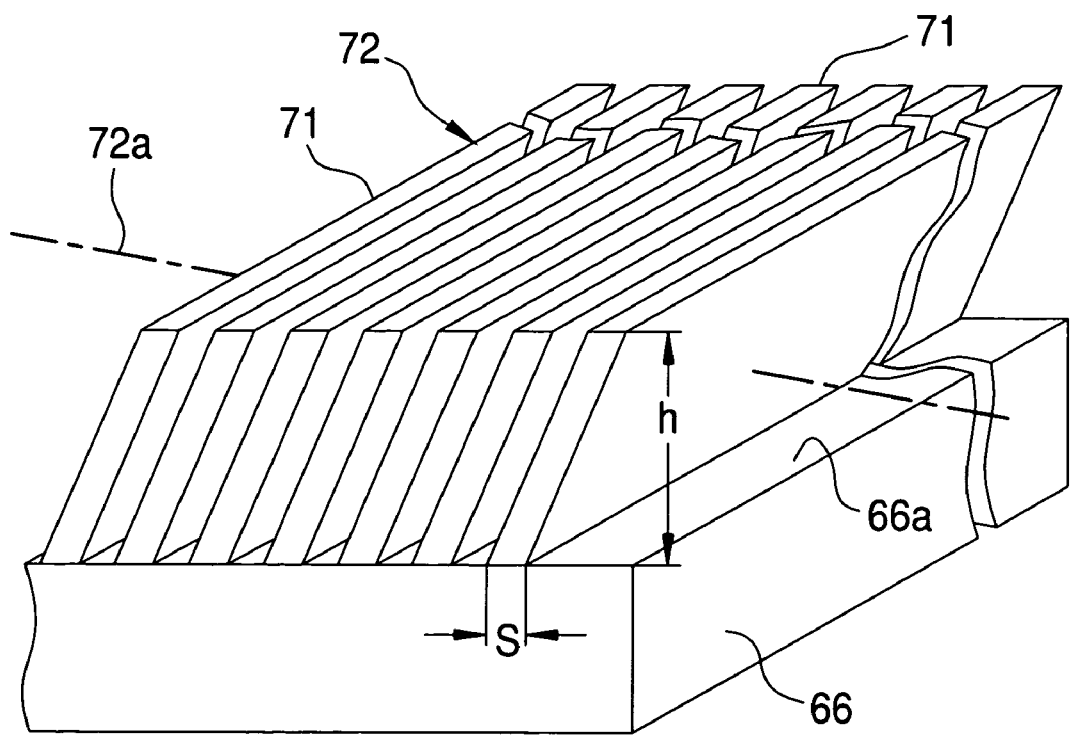

The ridges 67, 71 shown in FIGS. 21, 22 are formed by photo lithography and etching processes. Note that the aspect ratio of the height h of the ridge 67, 71 to the width d thereof needs to be sufficiently large in order to obtain the negatively uniaxial birefringent effect. If the aspect ratio is not large enough, the form birefringence 70, 72 becomes a biaxial birefringence body in which the refractive indices ($n_x$, $n_y$, $n_z$) in the refractive index ellipsoid are completely different.

Figure 23:
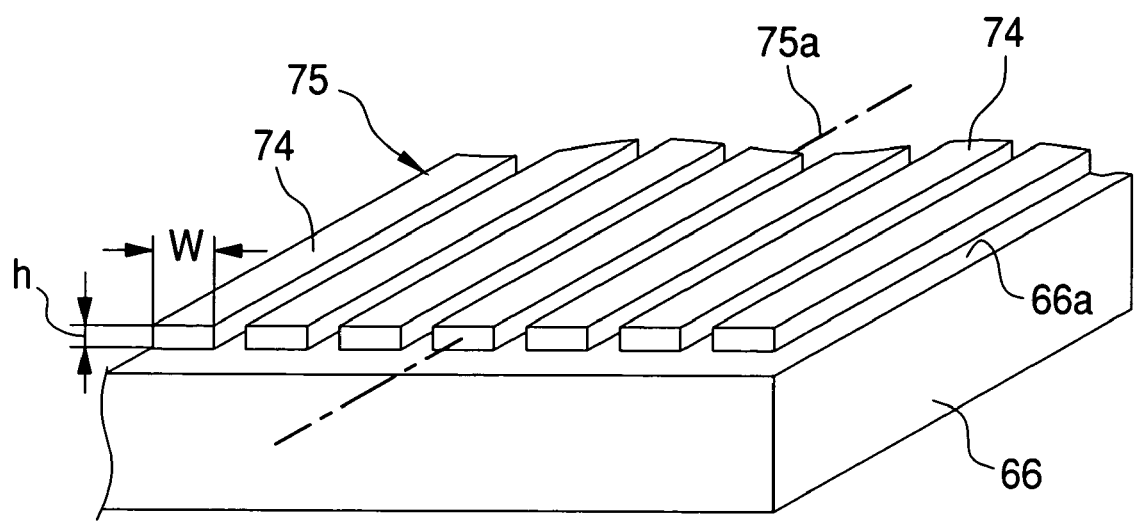

When the aspect ratio of the ridges is extremely small, the form birefringence becomes a positively birefringent a-plate, the optical isotropic axis of which extends in the plane parallel to the substrate. Thus, the positively birefringent a-plate is a retardation plate in which the retardation to polarized light passing through the form birefringence in the direction perpendicular to the substrate is different depending upon the polarized direction. The a-plate changes linearly polarized light, with the incident angle of 45 degrees, into circularly polarized light when the retardation d·Δn is one-fourth of the wavelength. Such a-plate is utilized as a quarter wave plate in combination of a reflective liquid crystal device. As shown in FIG. 23, an example of the form birefringence 75 as the positively birefringence a-plate has transparent dielectric ridges 74 arranged in line at certain intervals on the glass substrate 66. The width W, height h and the interval of the ridges 74 are much smaller than the wavelength of incident light.

The optical isotropic axis 75a extends in the direction parallel to the ridges 74. The arrangement of the ridges 74 causes one-dimensional refractive index distribution by air and the ridge in the plane perpendicular to the illumination or projection axis. The form birefringence 75 is located such that the top surface 66a of the glass plate 66 is perpendicular to the illumination or projection axis. The retardation of the form birefringence 75 is defined as the product of the height h and the birefringence value Δn that depends on the structure and the refractive index of the ridge 74. Thus, it is possible to adjust the retardation by changing the height h in accordance with the primary color of incident light. When the height h of the ridge 74 becomes larger than the wavelength of incident light, the form birefringence 75 becomes a biaxial birefringence body. If the height of the ridge 74 becomes much larger than the wavelength, the form birefringence 75 exhibits optical characteristics of a negatively birefringent c-plate. Note that the gap between two ridges 74 may be filled with a dielectric material with different refractive index from the ridge 74.

Figure 24:
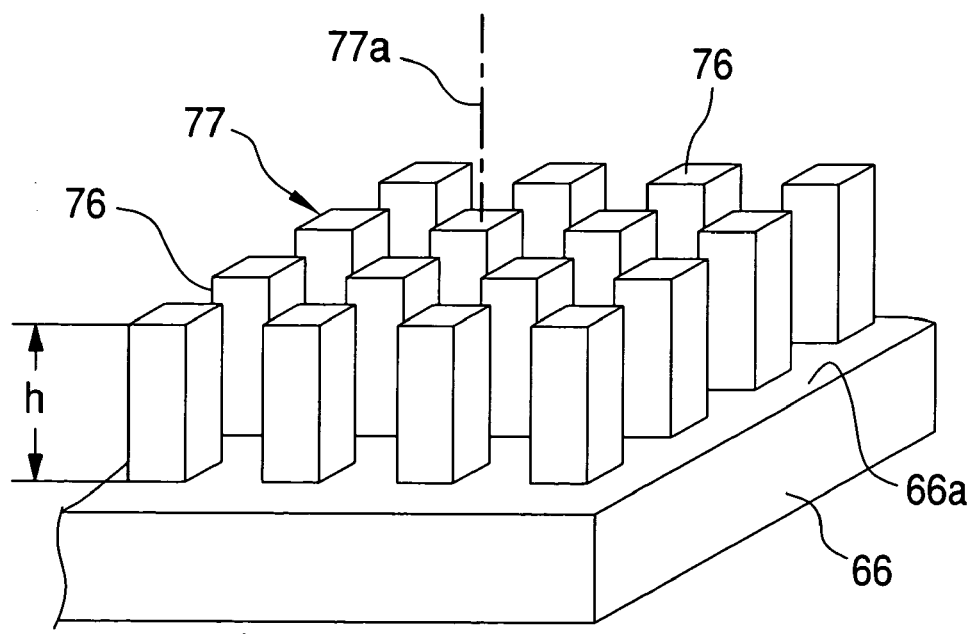
Figure 25:
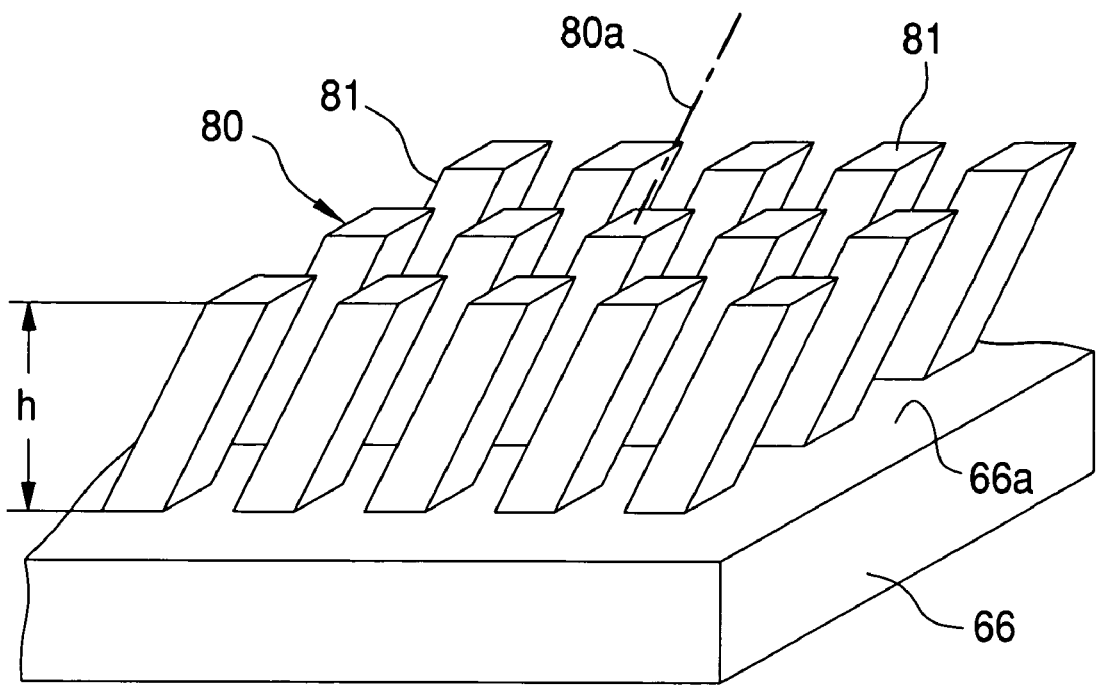
Figure 26:
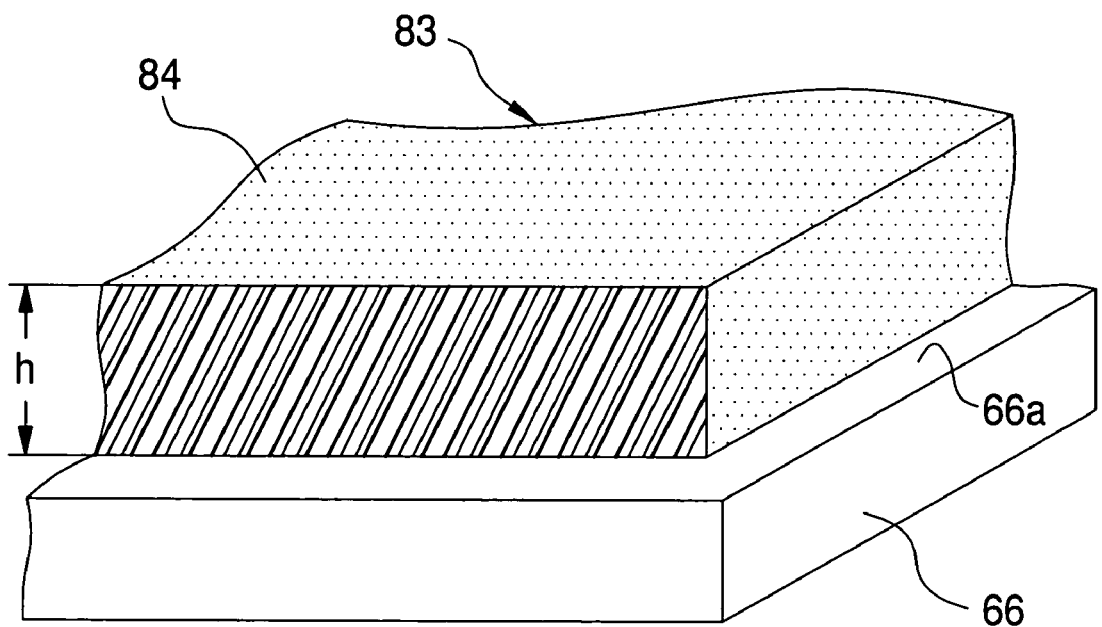

FIGS. 24, 25 and 26 illustrate examples of the positive form birefringence. In FIG. 23, the form birefringence 77 has transparent dielectric pillars 76 arranged at certain intervals on the glass substrate 66. Each dielectric pillar 76 has a substantially rectangular parallelepiped shape. The size and the intervals of the dielectric pillars 76 are much smaller than the wavelength of incident light, so the form birefringence 77 exhibits a positive c-plate in terms of crystal optics. The form birefringence 77 is located such that the top surface 66a of the glass plate 66 is perpendicular to the illumination or projection axis. The optical isotropy axis 77a is perpendicular to the top surface 66a of the glass substrate 66. The arrangement of the pillars 76 causes two-dimensional refractive index distribution by air and the pillar in the plane perpendicular to the illumination or projection axis. The pillars 76 are formed by photo lithography and etching processes. It is possible to adjust the retardation in accordance with the primary color of incident light by changing the height h of the ridges 76.

FIG. 25 shows another embodiment of the positively birefringent o-plate as the form birefringence 80 with transparent dielectric pillars 81 regularly arranged on the glass substrate 66. The dielectric pillars 81 are inclined to the glass substrate 66 at a predetermined angle. The size and the intervals of the dielectric pillars 81 are much smaller than the wavelength of incident light. The gap between the pillars 81 may be filled with air or a dielectric material with different refractive index from the pillar 81. The optical axis 80a of the form birefringence 80 is oblique to the top surface 66a of the glass substrate 66. The pillars 81 may be formed by photo lithography and etching processes. It is possible to adjust the retardation in accordance with the primary color of incident light by changing the height h of the pillars 81.

A dielectric layer 84 as the positively birefringent o-plate may be formed by oblique deposition of one kind of dielectric material on the glass substrate 66 (see FIG. 26), as described in U.S. Pat. No. 5,638,197. By use of the oblique deposition, it is possible to obtain the structure much smaller than the wavelength of incident light. Note that the oblique lines in FIG. 26 do not depict the borders between adjacent dielectric layers 84. The form birefringence 83 is located so that the top surface 66a of the glass plate 66 is perpendicular to the illumination or projection axis. Accordingly, the oblique thin film layers 84 exhibit positively birefringent o-plate. It is possible to adjust the retardation in accordance with the primary color of incident light by changing the height h of the dielectric layer 84.

Although the form birefringence 70, 72, 80, 83 illustrated in FIGS. 21 to 26 and the above described retardation compensation film having alternate high and low refractive index thin film layers have different physical structures, they have the same characteristic in adjusting the retardation by changing the thickness (height h) in the incident optical axis while keeping the birefringence value Δn constant. Thereby, the form birefringence 70, 72, 80, 83 is advantageous in mass production due to its facility in manufacture.

For the purpose of compensating the retardation of incident light caused by the liquid crystal device, plural form birefringences may be combined. For instance, the combination of negative and positive form birefringences makes it possible to compensate the retardation more effectively so that the image contrast ratio on the screen may improve. The retardation compensator is applicable to the liquid crystal devices of other type than transmissive TN and ECB type. Examples of the liquid crystal devices are reflective VA (Vertical Aligned) type, OCB (Optically Compensated Birefringence) type and FLC (Ferro electric Liquid Crystal) type. The present invention is also applicable to the liquid crystal projector, such as the off-axis type and the micro lens type, in which incident light obliquely enters the liquid crystal device.

In forming the retardation compensation film from thin films by deposition or sputtering, the substrate may be fixed to the optical part such as the lens element of illumination or projection lens system and the glass substrate of the liquid crystal device. Forming the retardation compensation film on such optical part is effective in reducing the number of the optical parts and the alignment procedure to adjust the position and angle of the optical parts.

The retardation compensation film may be attached on either the inner surface or the outer surface of the substrate of the liquid crystal device. The retardation compensation film is preferably attached on the inner surface for the purpose of reducing interfacial reflection between air and the retardation compensator. Such arrangement can effectively decrease light leakage or deterioration in image quality. The retardation compensation film may be attached to either the active side substrate with pixel electrodes to apply the voltage, or the opposite side substrate with the common electrode. The anti-reflection coating is preferably on either or both sides of the retardation compensation film, if necessary. Interferential thin films as the anti-reflection coating are easily formed during the some batch of process to deposit thin film layers for the retardation compensation film.

The thickness ratio of two different thin films for the retardation compensation film is not limited to 3:2 described in the above embodiments, but may be other ratio such as 1:1. The retardation compensation film in the liquid crystal projector is not limited to the one with two kinds of thin films alternatively deposited on the substrate. For instance, more than two kinds of thin films with different refractive indices may be deposited. The thickness and the deposition order may be determined in consideration of fabrication facility, internal stress in each layer, wavelength dependency of the refractive index of the thin film, and so forth. It is possible to combine the form birefringence described above with a retardation compensation sheet that has a polymer film with durability as the substrate.

Various changes and modifications are possible in the present invention and may be understood to be within the present invention.

What is claimed is:

1. A liquid crystal projector having liquid crystal devices for plural primary color lights, the primary color lights passing through the corresponding liquid crystal device being focused on a screen to display an image, the liquid crystal projector comprising:
   retardation compensators, formed from inorganic materials, adjacent to at least one of the incidence surface side and the emanation surface side of the liquid crystal devices, and the retardation compensator for the primary color light with the shortest wavelength having a different thickness in the direction of the optical axis of its respective liquid crystal device from the retardation compensator(s) for other primary color(s).

2. The liquid crystal projector according to claim 1, wherein each retardation compensator is a retardation compensation film composed of at least of two kinds of thin film layers with different refractive indices, and the optical thickness of each thin film layer is $1/100$ to $1/5$ of the wavelength of corresponding primary color light.

3. The liquid crystal projector according to claim 2, wherein the retardation compensators for all primary color lights have a common combination of the inorganic materials for at least two kinds of thin film layers.

4. The liquid crystal projector according to claim 3, wherein the number of the layered thin films of the retardation compensator for the primary color light with the shortest wavelength is smaller than that of the retardation compensator for other primary color light.

5. The liquid crystal projector according to claim 1, wherein the retardation compensator is a plurality of birefringent members arranged to appear one or two dimensional refractive index distribution in the plane perpendicular to the optical axis of the primary color light,
   wherein the length of the birefringence member for the shortest wavelength primary color light in the optical axis is smaller than that for other primary color light.

6. The liquid crystal projector according to claim 1, wherein the retardation compensators for the plural primary color lights are each formed of the same materials.

7. A system for compensating retardation caused by birefringence of incident light to liquid crystal devices, each of the liquid crystal devices is provided in the optical axis of a respective one of plural primary color lights with different wavelengths, the system comprising:
   retardation compensators, formed from inorganic materials, adjacent to at least one of the incidence surface side and the emanation surface side of the liquid crystal devices, and the retardation compensator for the primary color light with the shortest wavelength having a different thickness in the direction of the optical axis of its respective liquid crystal device from the retardation compensator(s) for other primary color(s).

8. The system according to claim 7, wherein the retardation compensators for the plural primary color lights are each formed of the same materials.

9. The system according to claim 7, wherein each retardation compensator is a retardation compensation film composed of at least of two kinds of thin film layers with different refractive indices, and the optical thickness of each thin film layer is $1/100$ to $1/5$ of the wavelength of corresponding primary color light.

10. The system according to claim 9, wherein the retardation compensators for all primary color lights have a common combination of the inorganic materials for at least two kinds of thin film layers.

11. The system according to claim 10, wherein the number of the layered thin films of the retardation compensator for the primary color light with the shortest wavelength is smaller than that of the retardation compensator for other primary color light.

12. The system according to claim 7, wherein the retardation compensator is a plurality of birefringent members arranged to appear one or two dimensional refractive index distribution in the plane perpendicular to the optical axis of the primary color light,
   wherein the length of the birefringent member for the shortest wavelength primary color light in the optical axis is smaller than that for other primary color light.

* * * * *